United States Patent
Nozoe et al.

(10) Patent No.: US 6,927,568 B2
(45) Date of Patent: Aug. 9, 2005

(54) ROTATIONAL-RATE SENSOR

(75) Inventors: Toshiyuki Nozoe, Kyoto (JP); Sigehiro Yosiuti, Kashiwara (JP); Shusaku Kawasaki, Osaka (JP); Noriyuki Jitousho, Moriguchi (JP); Satoshi Ohuchi, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/964,869

(22) Filed: Oct. 15, 2004

(65) Prior Publication Data

US 2005/0081628 A1 Apr. 21, 2005

(30) Foreign Application Priority Data

Oct. 17, 2003 (JP) .......................................... 2003-357695

(51) Int. Cl.[7] .................................................. G01B 7/30
(52) U.S. Cl. ................................................. 324/207.25
(58) Field of Search ........................ 324/207.23, 207.25, 324/633, 652; 73/488, 514.31–514.34

(56) References Cited

U.S. PATENT DOCUMENTS 5,587,529 A * 12/1996 Iguchi et al. ............ 73/504.13
5,817,940 A * 10/1998 Kobayashi et al. ...... 73/504.12
5,986,549 A * 11/1999 Teodorescu ................ 340/561
6,389,897 B1 * 5/2002 Tani et al. ............... 73/504.12

FOREIGN PATENT DOCUMENTS

| EP | 0 660 081 A1 | 6/1995 |
| EP | 1 091 189 A1 | 4/2001 |
| JP | 11-287658 | 10/1999 |

* cited by examiner

*Primary Examiner*—Bot LeDynh
(74) *Attorney, Agent, or Firm*—Wenderoth, Lind & Ponack, L.L.P.

(57) ABSTRACT

A rotational-rate sensor is provided which includes a detecting element, a circuit portion, an airtight container and an elastic body, in which: the synthetic resonance-frequency of a machine system of the rotational-rate sensor and the frequency of an applied rotational rate which corresponds to the difference between the resonance frequency in the direction where the detecting element is driven and the resonance frequency of the detecting element in the direction where the detecting element detects a rotational rate, are each lower than each of the resonance frequency in the direction where the detecting element is driven and the resonance frequency in the direction where the detecting element detects a rotational rate; and the cut-off frequency of the low-pass filter in the circuit portion is lower than each of the synthetic resonance-frequency and the frequency of the applied rotational rate.

56 Claims, 23 Drawing Sheets

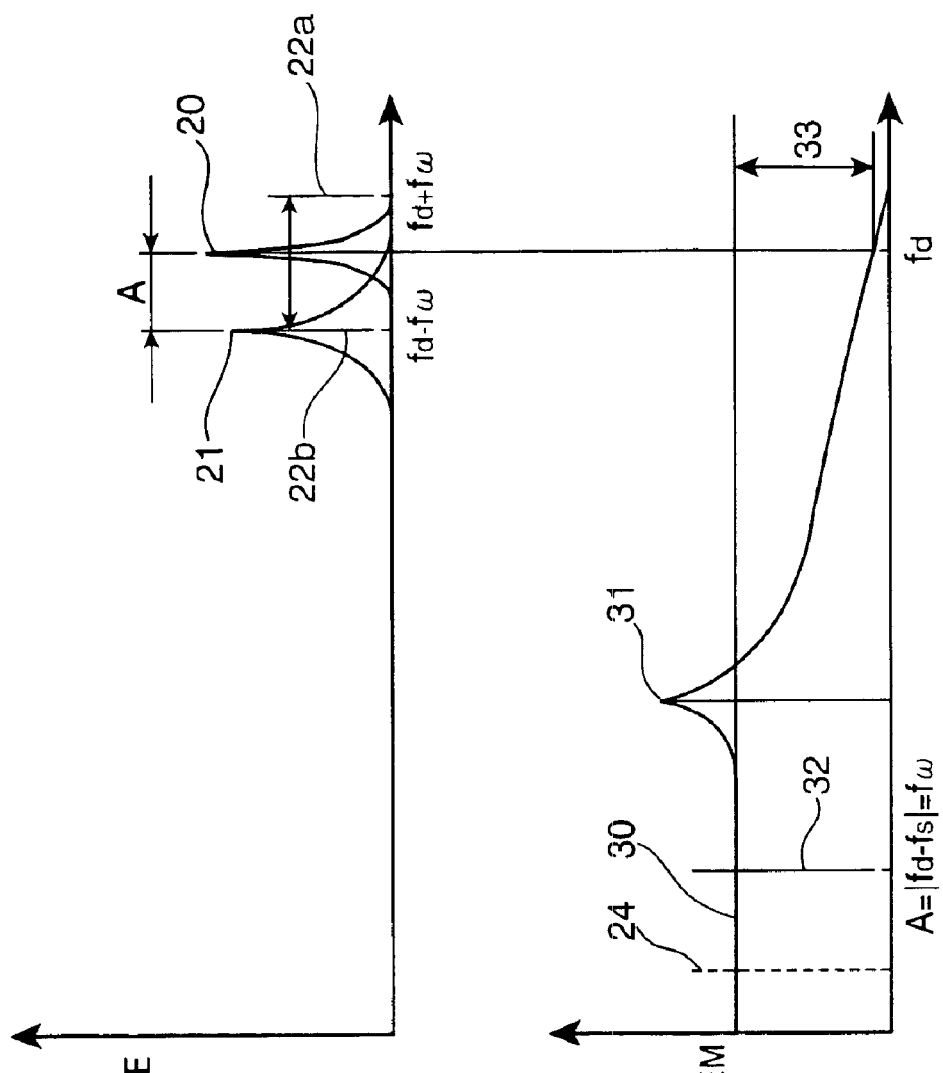

ROTATIONAL-RATE SENSOR

BACKGROUND OF THE INVENTION

1. Field of the Invention

The present invention relates to a rotational-rate sensor which is capable of detecting a rotational rate.

2. Description of the Related Art

As a conventional rotational-rate sensor, for example, a vibration gyro is known which is described in Japanese Patent Laid-Open No. 11-287658 specification. In this vibration gyro, a vibrator is supported near its node point with a support member which is made up of a U-shaped, fine wire. Both ends of the support member are fixed on a rectangular attachment substrate which is made of glass epoxy or the like. The attachment substrate is fixed to the node-point part in the vibration mode of the attachment substrate which is generated by the vibrator's vibration. Thereby, it is held on a base plate.

However, in such a vibration gyro, a vibration is designed to be separated, using a mechanical filter effect which is produced by lowering the resonance frequency of the whole system. This requires that the vibrator's node point and its vicinity be supported with the U-shaped, fine wire. Such a structure, in which they are supported using the fine wire, becomes extremely complicated. This makes the vibration gyro less reliable, and also makes it extremely weak against an applied impact.

DISCLOSURE OF THE INVENTION

It is an object of the present invention to provide a rotational-rate sensor which is resistant to an applied impact and is highly reliable.

A rotational-rate sensor according to an aspect of the present invention, comprising: a detecting element; a circuit portion for controlling the drive of the detecting element at the resonance frequency thereof in the direction where the detecting element is driven, and outputting, through a low-pass filter, a signal according to a rotational rate that is obtained from the detecting element; an airtight container which houses the detecting element and the circuit portion, the airtight container being made of ceramics or resin and including wiring for transmitting an input and output signal to the circuit portion; and an elastic body which is disposed between the airtight container and an attached body to which the rotational-rate sensor is attached, wherein: the synthetic resonance-frequency of a machine system which is formed at least by the detecting element, the circuit portion, the airtight container and the elastic body, and the frequency of an applied rotational rate which corresponds to the difference between the resonance frequency in the direction where the detecting element is driven and the resonance frequency of the detecting element in the direction where the detecting element detects a rotational rate, are each lower than each of the resonance frequency in the direction where the detecting element is driven and the resonance frequency in the direction where the detecting element detects a rotational rate; and the cut-off frequency of the low-pass filter in the circuit portion is lower than each of the synthetic resonance-frequency and the frequency of the applied rotational rate.

According to this configuration, a rotational-rate sensor can be provided which is resistant to an applied impact and is highly reliable.

These and other objects, features and advantages of the present invention will become more apparent upon reading of the following detailed description along with the accompanied drawings.

BRIEF DESCRIPTION OF THE DRAWINGS

FIG. 6A is a graphical representation, showing a resonance characteristic of the crystal tuning-fork vibrator shown in FIG. 4. FIG. 6B is a graphical representation, showing a mechanical frequency-gain characteristic of a supporting system of the rotational-rate sensor shown in FIG. 1.

DETAILED DESCRIPTION OF INVENTION (First Embodiment)

First, a rotational-rate sensor according to a first embodiment of the present invention will be described.

Figure 1:
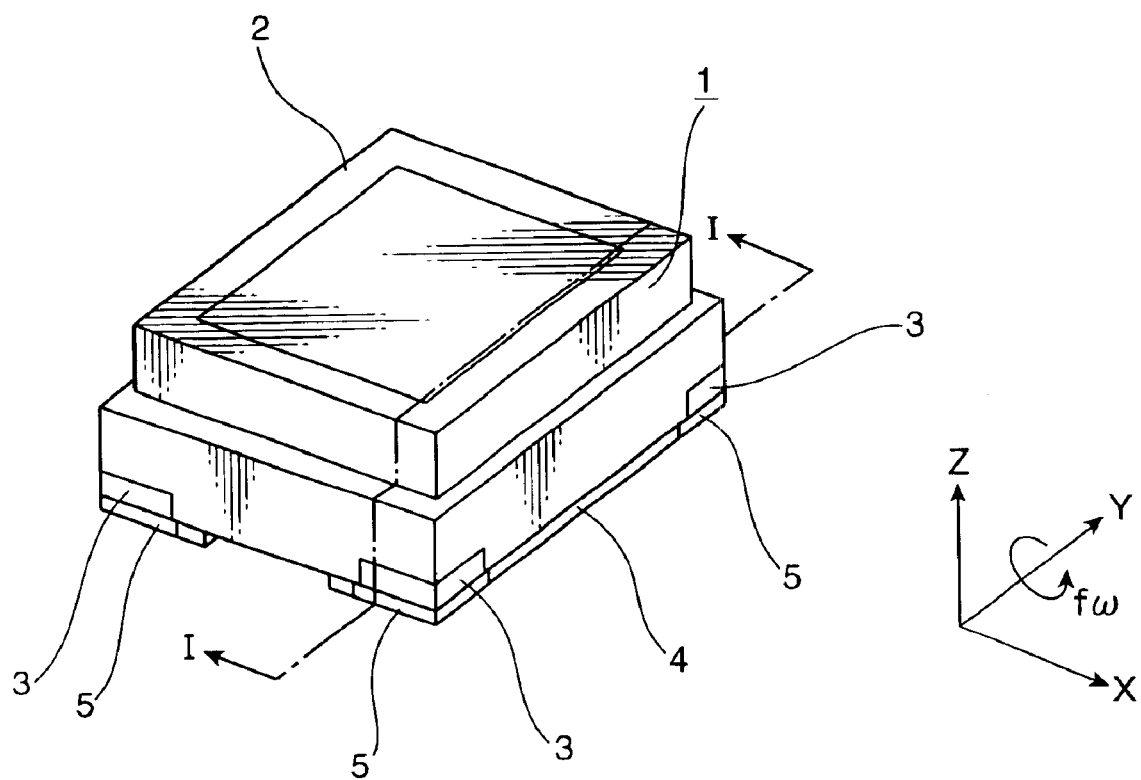
FIG. 1 is a perspective view of a rotational-rate sensor according to a first embodiment of the present invention.
Figure 2:
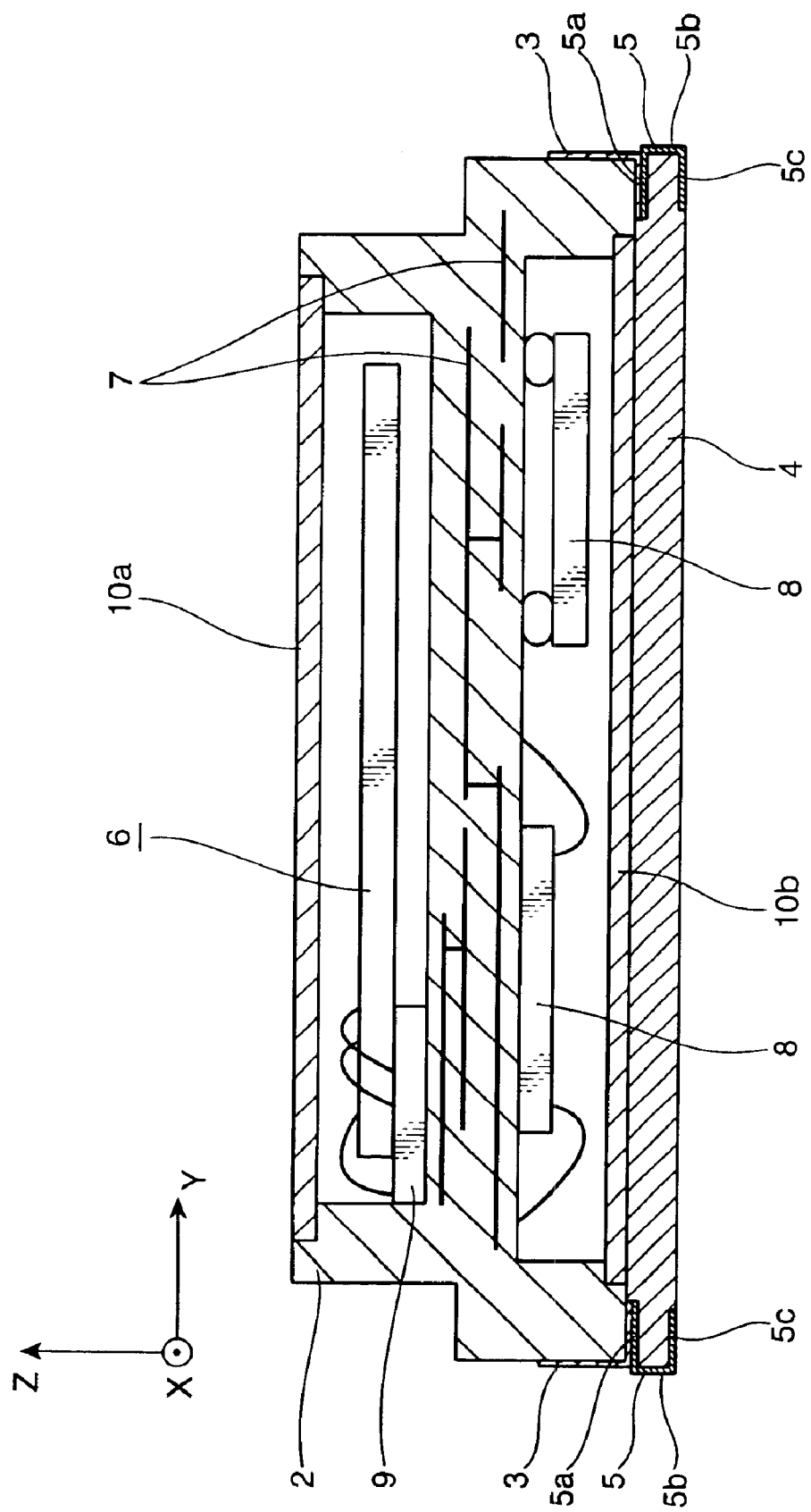
FIG. 2 is a sectional view of the rotational-rate sensor shown in FIG. 1, seen along an I—I line.

FIG. 1 is a perspective view of the rotational-rate sensor according to the first embodiment of the present invention. FIG. 2 is a sectional view of the rotational-rate sensor shown in FIG. 1, seen along an I—I line. Herein, an X-axis, a Y-axis and a Z-axis shown in FIG. 1 are the axes which shows the width direction, the longitudinal direction and the thickness direction of an airtight container 2, respectively.

A rotational-rate sensor 1 shown in FIG. 1 and FIG. 2 includes: the airtight container 2; pad electrodes 3; a silicone rubber 4; and a conductor portion 5.

The airtight container 2 has a rectangular-parallelepiped shape, and is made of resin such as ceramics and epoxy. The pad electrode 3 is made of gold or the like, and is placed at the lower part of the airtight container 2. It is used to supply power to the airtight rotational-rate sensor 1 and take out an output. The silicone rubber 4 is united at the bottom of the airtight container 2 therewith. It functions as the elastic body. Herein, the silicone rubber 4 may also be attached to the bottom of the airtight container 2.

The conductor portion 5 is made up of a first pad electrode 5a, a conductor pattern 5b, and a second pad electrode 5c. The first pad electrode 5a is placed in a position which is on the upper surface of the silicone rubber 4 and that corresponds to the pad electrode 3 of the airtight container 2. The second pad electrode 5c is placed on the lower surface of the silicone rubber 4. It is electrically connected to an external electrode (not shown) which is provided in a substrate or the like. The conductor pattern 5b is placed on the side of the silicone rubber 4. It connects the first and second pad electrodes 5a, 5c. Despite such a simple configuration, this gives the silicone rubber 4 which works as a mechanical support the function of making an electric connection.

The second pad electrodes 5c are placed at the four corners on the lower surface of the silicone rubber 4. In this case, when this sensor is mounted, the surface tension of solder works on the four corners, thus realizing its self alignment.

Each conductor portion 5 includes at least three systems of electrode functions for a power source, an output and a ground. It is placed so the pad electrode for an output is located between the pad electrode for a power source and the pad electrode for a ground. In this case, when this sensor is soldered on a substrate, solder can be prevented from flowing into there. This helps keep a short circuit between the electrode and the ground from taking place.

A crystal tuning-fork vibrator 6 as the detecting element is provided in the upper part inside of the airtight container 2. The crystal tuning-fork vibrator 6 is supported and fixed on a seat 9, using an adhesive or the like. A stratified wiring 7 is provided below the crystal tuning-fork vibrator 6. The crystal tuning-fork vibrator 6 and a circuit portion 8 are connected via the wiring 7. The circuit portion 8 is made up of, for example, a semiconductor bare chip. It is connected to a pad electrode (not shown) which is provided inside of the airtight container 2, by means of wire bonding or a bump. The circuit portion 8 controls the drive of the crystal tuning-fork vibrator 6 at the resonance frequency in the direction where it is driven. Then, it adjusts and outputs a signal according to the rotational rate that has been obtained from the crystal tuning-fork vibrator 6. Lids 10a, 10b are made of metal or the like. After the airtight container 2 is filled with gas, the airtight container 2 is sealed with the lids 10a, 10b, using welding or gluing. This keeps the airtight container 2 airtight.

Figure 3:
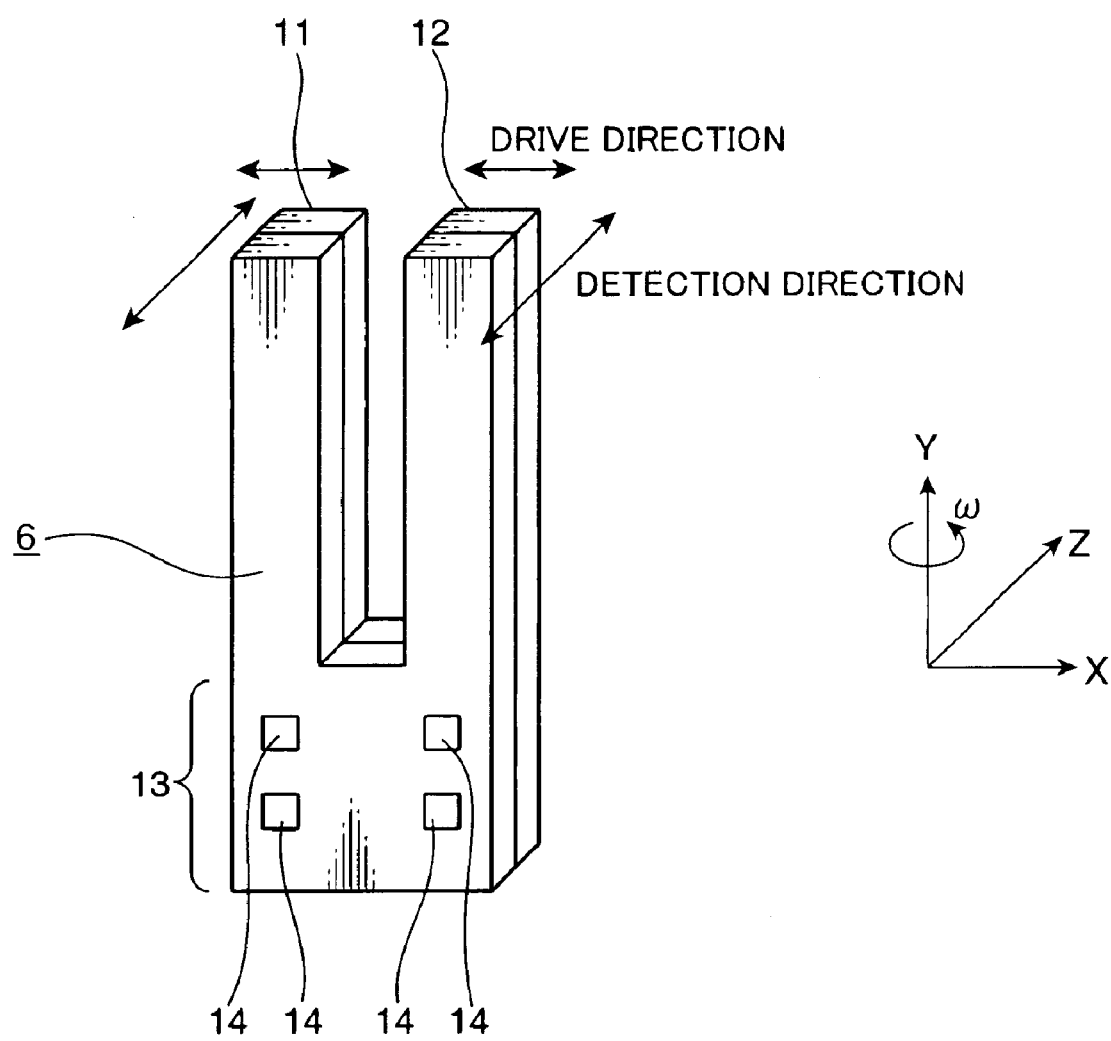
FIG. 3 is a perspective view of a crystal tuning-fork vibrator which configures the rotational-rate sensor shown in FIG. 1.

FIG. 3 is a perspective view of the crystal tuning-fork vibrator shown in FIG. 2. The crystal tuning-fork vibrator 6 shown in FIG. 3 is a resonance-type vibrator which is made of single-crystal quartz or joined quartz. It has a superior temperature characteristic. For example, two quartz plates which each have a tuning-fork shape are directly joined at the level of an inter-atomic bond. Thereby, a resonance-type vibrator which is made of the joined quartz can be created.

The crystal tuning-fork vibrator 6 includes two arms 11, 12, and a base portion 13 which connects the arms 11, 12. The base portion 13 does not have a beam or narrow portion structure which separates a vibration. Therefore, the crystal tuning-fork vibrator 6 can be prevented from being broken down, even though it drops from one meter above a concrete surface (which is equivalent to a momentary impact beyond ten thousand G).

Pad electrodes 14 are formed on the base portion 13, by evaporating chromium and gold. They are connected to an electrode (not shown) for tuning-fork drive and a detection electrode (not shown) for the detection of a signal according to a rotational rate, which are formed on the arms 11, 12 by evaporating chromium and gold, respectively. The pad electrode 14 Is connected to a pad electrode (not shown) which is provided in the airtight container 2, by means of wire bonding or a bump.

With reference to FIG. 1 to FIG. 3, a drive signal is supplied from the circuit portion 8 to the pad electrode 14 on the crystal tuning-fork vibrator 6. Thereby, the arms 11, 12 vibrate in the X-axis directions. If a rotational rate ω is applied around the Y-axis, then in proportion to the mass of the arms 11, 12, force (I.e., Coriolis' force) is produced which works in the vector-product directions (i.e., the Z-axis directions) of the amplitude-speed vector and rotational-rate vector of the arms 11, 12. This Coriolis' force deflects the arms 11, 12 in the directions (i.e., the Z-axis directions) where a rotational rate is detected. Then, a signal which is proportional to this deflection slope is detected by a detection electrode on the crystal tuning-fork vibrator 6. Next, the wave of this detected signal is synchronously detected, using a drive signal in the circuit portion 8. Sequentially, the signal after the synchronous wave-detection is amplified, and then, is processed at a low-pass filter. Thereby, a sensor signal can be obtained according to the rotational rate.

Figure 4:
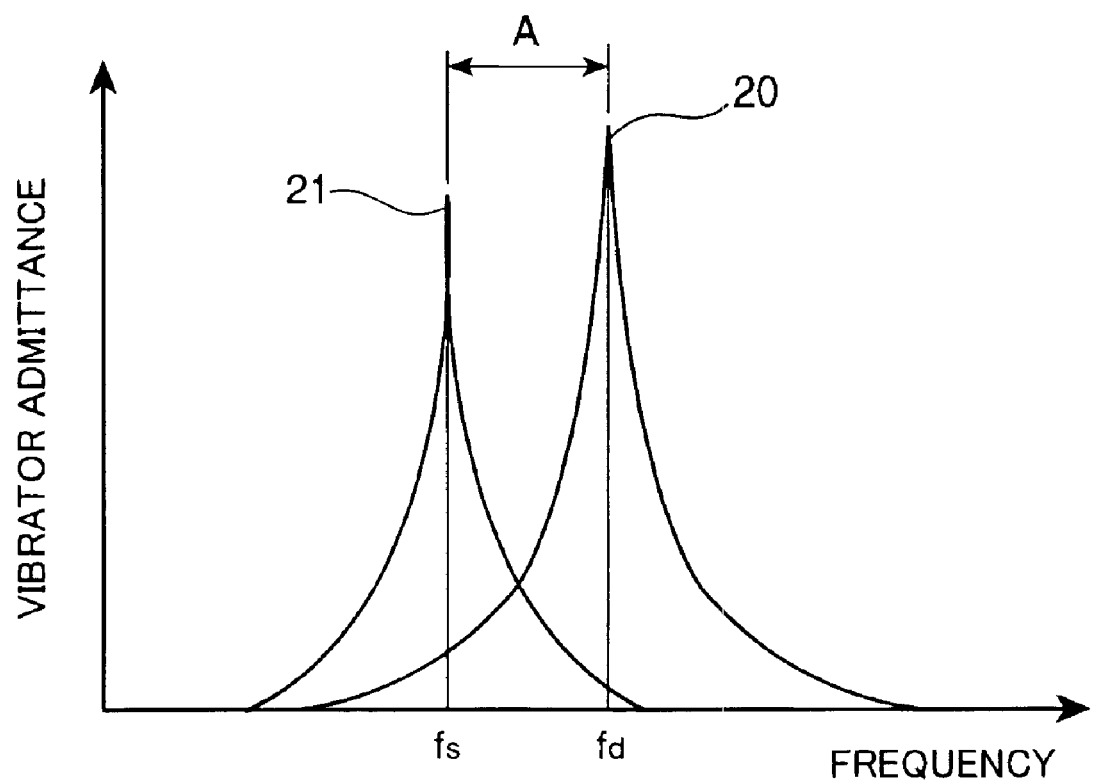
FIG. 4 is a graphical representation, showing a resonance characteristic of the crystal tuning-fork vibrator shown in FIG. 3.

FIG. 4 is a graphical representation, showing a resonance characteristic of the crystal tuning-fork vibrator shown in FIG. 3. The horizontal axis represents a frequency, and the vertical axis shows an admittance (which indicates how easily a vibration is given). In FIG. 4, reference numerals 20, 21 denote a resonance frequency (hereinafter, referred to briefly as the "fd") in the directions where the crystal tuning-fork vibrator shown in FIG. 3 is driven, and a resonance frequency (hereinafter, referred to briefly as the "fs") in the directions where a rotational rate is detected, respectively. Reference character A designates a frequency (hereinafter, referred to as the "detuning frequency") which is equivalent to the difference between fd and fs.

According to this embodiment, 10 kHz is used as fd of the crystal tuning-fork vibrator 6. Generally, in order to heighten sensitivity in the directions where a rotational rate is detected, the dimensions and shape of the crystal tuning-fork vibrator 6 are designed, so that a vibration in the detection directions can be easily excited by bringing fd close to fs. The lower the detuning frequency A becomes, the closer the crystal tuning-fork vibrator 6 comes to a resonant state so that sensitivity can be enhanced. For example, in the case of a navigation system, a rollover system and advanced ABS (or antilock brake system), preferably, the detuning frequency A should be set at a frequency of 200 Hz to 400 Hz, 300 Hz to 500 Hz, and 300 Hz to 400 Hz, respectively.

Figure 5A:
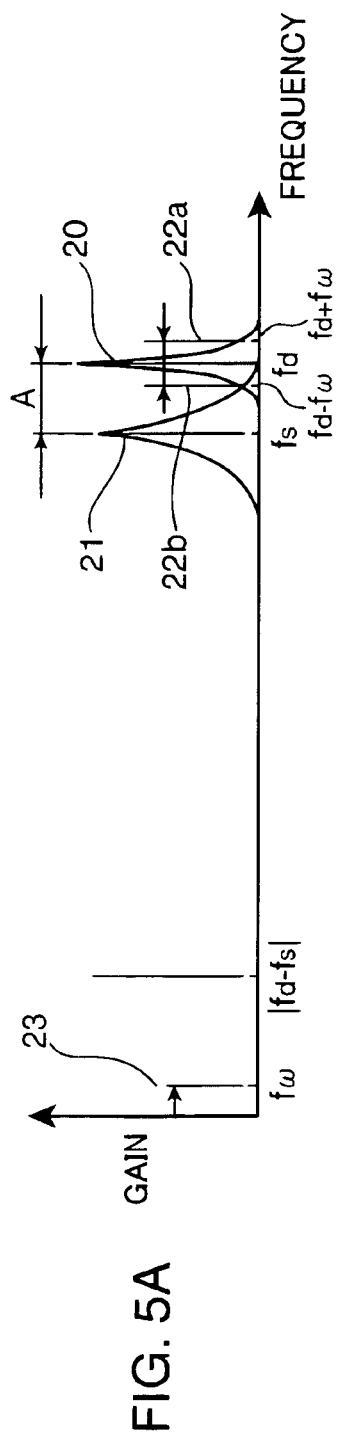
FIG. 5A is a graphical representation, showing a frequency spectrum of the crystal tuning-fork vibrator of the rotational-rate sensor shown in FIG. 1.
Figure 5B:
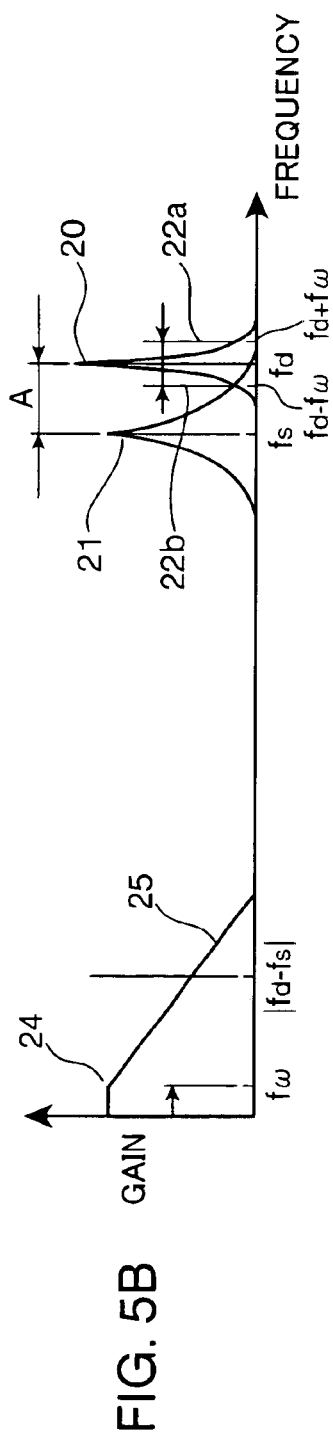
FIG. 5B is a graphical representation, showing a characteristic of a low-pass filter inside of a circuit portion of the rotational-rate sensor shown in FIG. 1.
Figure 5C:
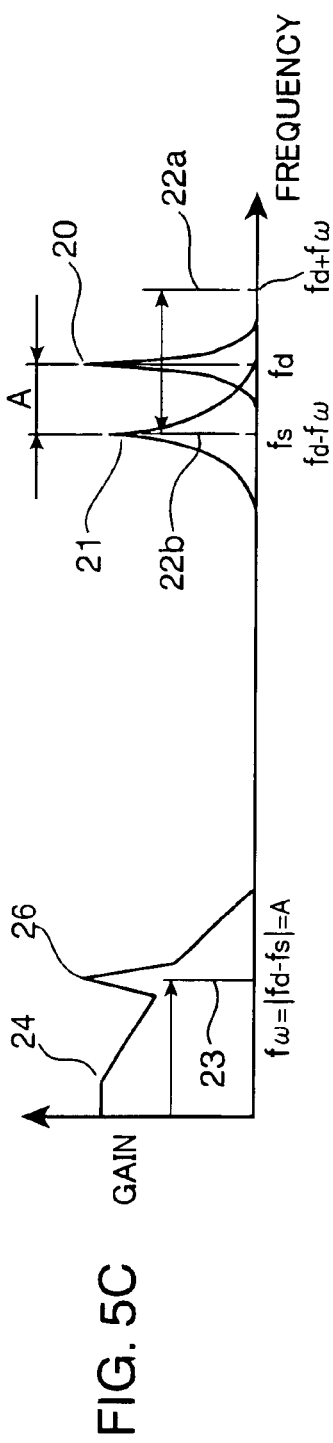
FIG. 5C is a graphical representation, showing a frequency-gain characteristic after a passage through the low-pass filter inside of a circuit portion of the rotational-rate sensor shown in FIG. 1.

FIG. 5A is a graphical representation, showing a frequency spectrum of the crystal tuning-fork vibrator of the rotational-rate sensor shown in FIG. 1. FIG. 5B is a graphical representation, showing a characteristic of a low-pass filter inside of a circuit portion of the rotational-rate sensor shown in FIG. 1. FIG. 5C is a graphical representation, showing a frequency-gain characteristic after a passage through the low-pass filter inside of a circuit portion of the rotational-rate sensor shown in FIG. 1. In FIG. 5A to FIG. 5C, reference numerals 20, 21 denote fd and fs, respectively; 22a, 22b, a modulated side-wave (fd+ fω) and a modulated side-wave (fd −fω) respectively; 23, a frequency fω which corresponds to the rotational rate ω; 24, a point which indicates a cut-off frequency of the low-pass filter; 25, a straight line which shows a gain-descent characteristic with respect to a frequency in the low-pass filter; and 26, a beat component. The horizontal axis in each figure represents a frequency, and the vertical axis shows a gain.

FIG. 5A shows a frequency spectrum which describes a modulated side-wave near fd when a rotation which has the frequency fω is applied around the Y-axis of the crystal tuning-fork vibrator 6. As shown in FIG. 5A, when a frequency (fω) 23 which corresponds to the rotational rate ω is applied around the Y-axis of the crystal tuning-fork vibrator 6, fd is amplified and modulated using the frequency (fω) 23. Thus, the modulated side-wave (fd+fω) 22a and the modulated side-wave (fd−fω) 22b are generated above and below fd. The peak value of each of these modulated side-wave (fd+fω) 22a and the modulated side-wave (fd−fω) 22b is determined according to the width of an amplitude in the drive directions (i.e., the X-axis directions), the sharpness (or Q-value) of a mechanical resonance in the detection directions (i.e., the Z-axis directions) and the detuning frequency A. These modulated side-wave (fd+fω) 22a and the modulated side-wave (fd−fω) 22b are demodulated (i.e., detected and smoothed). Thereby, a sensor output can be obtained according to the applied rotational rate.

FIG. 5B shows the characteristic of a low-pass filter inside of the circuit portion 8. As shown in FIG. 5B, at the time of a demodulation, unnecessary noise components are usually suppressed, and thus, an output is smoothed through the low-pass filter. As shown by the straight line 25 which shows a gain-descent characteristic with respect to a frequency in the low-pass filter, the gain-descent characteristic is set, so that the higher the frequency becomes, the output after the passage through the low-pass filter will be monotonously lowered.

For example, in the case of a navigation system, a rollover system and advanced ABS, preferably, the point 24 which indicates a cut-off frequency of the low-pass filter should be set at a frequency of 10 Hz, 50 Hz and 100 Hz, respectively. In the case of a navigation system, a rollover system and advanced ABS, it is preferable that the order of the straight line 25 which shows a gain-descent characteristic with respect to a frequency in the low-pass filter be set at two to four, three to four, three to five, respectively.

FIG. 5C shows a frequency-gain characteristic of an output after a passage through the low-pass filter when a rotational rate which corresponds to the detuning frequency A is applied around the Y-axis of the crystal tuning-fork vibrator 6. As shown in FIG. 5C. when the frequency (fω) 23 of the applied rotational rate comes close to the detuning frequency A (=fd−fs), for example, the modulated side-wave (fd−fω) 22b overlaps with fs. Thus, this modulated side-wave (fd−fω) 22b becomes a vibromotive force, which generates a vibration-level signal that is not correlative to the actual rotational rate in the detection directions (i.e., the Z-axis directions). Then, when this signal is demodulated, a peak 26 which has a sharp sensor-output is produced in the position of the frequency (fω) of the rotational rate which corresponds to the vicinity of the detuning frequency A (=fd−fs). This is generally called a beat component, which is a phenomenon common to a resonance-type rotational-rate sensor. This beat component is usually suppressed by the above described low-pass filter.

FIG. 6A is a graphical representation, showing a resonance characteristic of the crystal tuning-fork vibrator shown in FIG. 4. FIG. 6B is a graphical representation, showing a mechanical frequency-gain characteristic of a supporting system of the rotational-rate sensor shown in FIG. 1. In FIG. 6A and FIG. 6B, reference numeral 30 designates a transfer-characteristic curve of a supporting system (i.e., a mechanical system which is configured mainly by the crystal tuning-fork vibrator 6, the circuit portion 8, the airtight container 2 and the silicone rubber 4) of the sensor; 31, a resonance frequency at which the supporting-system transfer-characteristic curve 30 reaches a peak; 32, the detuning frequency A (=fd−fs)=fω; and 33, an attenuation value near fd on the supporting-system transfer-characteristic curve 30.

As the supporting-system transfer characteristic shown in FIG. 6B, it is preferable that the resonance frequency 31 be 2 kHz or higher, and 4 kHz or lower. More preferably, it should be 2 kHz. In addition, it is preferable that the detuning frequency A described using FIG. 5A to FIG. 5C be set at 200 Hz or higher, and 500 Hz or lower, the point 24 which indicates a cut-off frequency of the low-pass filter be set at 100 Hz or lower, and the order of the low-pass filter be set at substantially three or more. In this case, the rotational-rate sensor becomes resistant to an applied impact. At the same time, the reliability of an output within a frequency range where the sensor conducts a detection becomes extremely high, because a beat component can be efficiently suppressed which is easily produced at the frequency of the applied rotational-rate.

Figure 7:
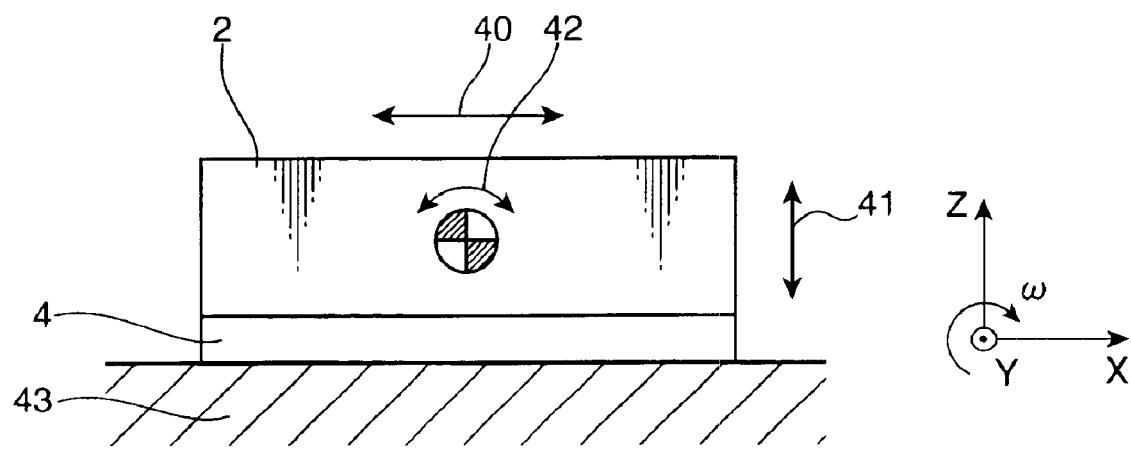
FIG. 7 is a side view of the rotational-rate sensor shown in FIG. 1 and a substrate on which it is mounted, typically showing how a disturbance impact is applied.

FIG. 7 is a side view of the rotational-rate sensor shown in FIG. 1 and a substrate on which it is mounted, typically showing how a disturbance impact is applied. In FIG. 7, reference numeral 40 denotes an impact acceleration in the drive directions (i.e., the X-axis directions); 41, an impact acceleration in the directions (i.e., the Z-axis directions) where a rotational rate is detected, and 42, an impact angular-moment which is generated around the Y-axis by a disturbance impact-acceleration, not naturally by a rotational rate. As shown in FIG. 7, the silicone rubber 4 which is united with the airtight container 2 shown in FIG. 1 at its bottom is glued and fixed to a mounting substrate 43 as the attached body. In this sensor, the crystal tuning-fork vibrator 6 shown in FIG. 3, the mechanical frequency-gain characteristic shown in FIG. 6B, and the characteristic of the low-pass filter shown in FIG. 5C, are combined. Therefore, the crystal tuning-fork vibrator 6 is resistant to an impact which is given when it falls. In addition, if the frequency (fω) of the rotational rate which corresponds to the detuning frequency A (=fd−fs) is applied, a beat component can be suppressed. Further, as shown in FIG. 6B, the peak 31 of a resonance frequency is set to be higher than the frequency (fω) 32 of the rotational rate which corresponds to the detuning frequency A (=fd−fs). This prevents the resonance of a mechanical system from increasing a beat component carelessly. Moreover, the attenuation value 33 of a mechanical system is large near fd, and thereby, the sensor becomes stronger against the impact accelerations 40, 41 from the outside, or the impact angular-moment 42. For example, in the case where the mass of the rotational-rate sensor 1 is 5 grams, the hardness of the silicone rubber 4 is 30 degrees, and its thickness is 0.5 mm, it is confirmed that an impact given when it drops onto a concrete surface is attenuated below approximately 1,000 G.

Figure 8:
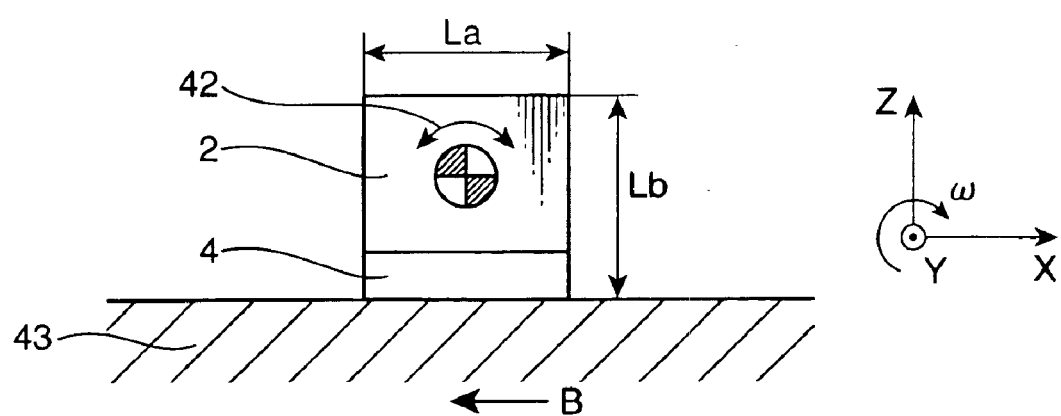
FIG. 8 is a side view of the rotational-rate sensor and the substrate shown in FIG. 7, typically showing the dimensional relation between an airtight container and a silicone rubber.

FIG. 8 typically shows the dimensional relation between the airtight container and the silicone rubber shown in FIG. 7. In FIG. 8, reference character La designates a width (i.e., a length in the X-axis directions, or in the directions perpendicular to the detection axis where a rotational rate is detected) of the airtight container 2 shown in FIG. 7. On the other hand, reference character Lb denotes a total thickness of the thickness (i.e., a length in the Z-axis directions) of the airtight container 2 shown in FIG. 7 and the thickness (i.e., a length in the Z-axis directions) of the silicone rubber 4. An arrow B shows the direction of the impact acceleration 40 (see FIG. 7) which is applied to the mounting substrate 43 from the outside, in parallel to the width directions (i.e., the X-axis directions) of the airtight container 2. This impact acceleration 40 generates the impact angular-moment 42 around the Y-axis.

Figure 9:
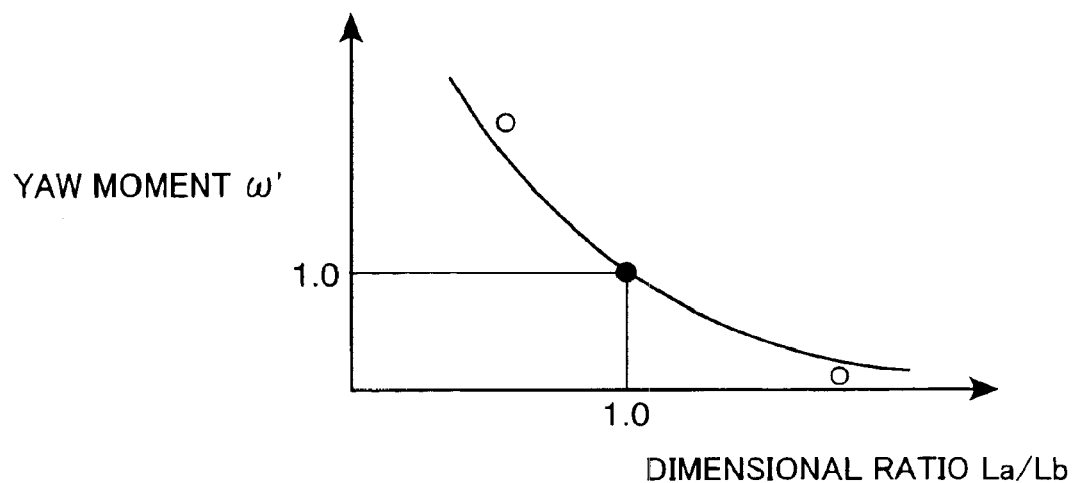
FIG. 9 is a graphical representation, showing the correlation between the dimensional ratio of the airtight container to the silicone rubber shown in FIG. 8, and a rotational rate.

FIG. 9 is a graphical representation, showing the correlation between the dimensional ratio of the airtight container to the silicone rubber shown in FIG. 8, and a rotational rate. As shown in FIG. 9, when the dimensional ratio La/Lb of the airtight container 2 and the silicone rubber 4 shown in FIG. 8 is 1.0, an angular moment (i.e., a yaw moment) ω' around the detection axis at the time when an impact is applied is set at 1.0. In this case, if the dimensional ratio La/Lb becomes 1.0 or more, the airtight container 2 will gradually be substantially flat. This keeps down an occurrence of the angular moment ω' around the detection axis at the time when an impact is applied.

Figure 10:
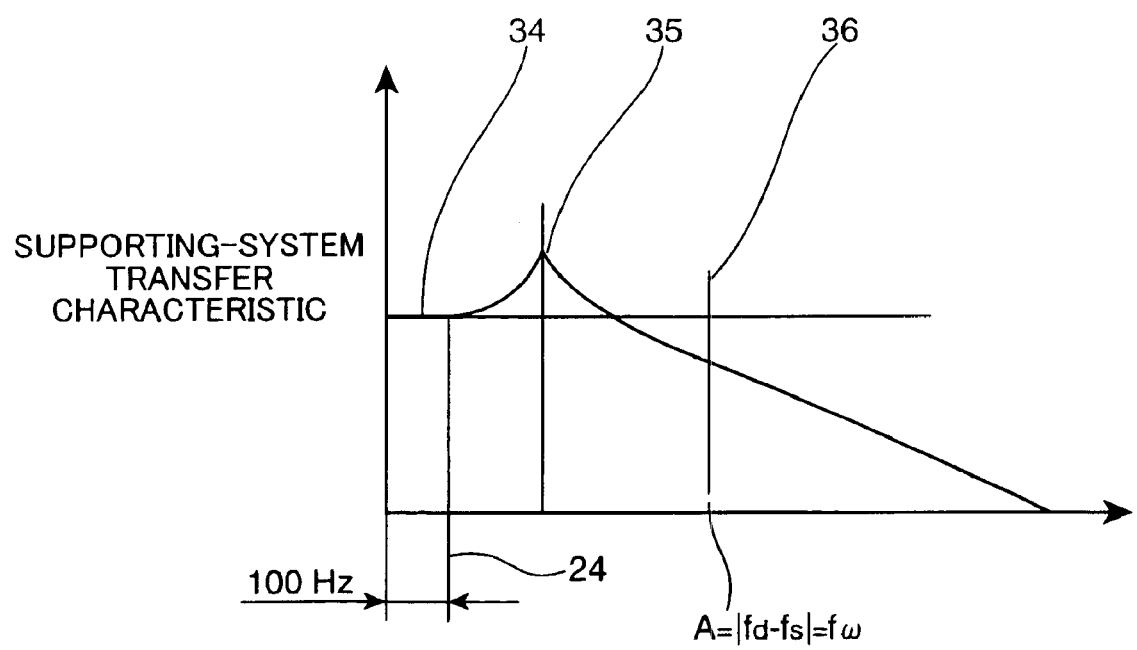
FIG. 10 is a graphical representation, showing another mechanical frequency-gain characteristic of the supporting system of the rotational-rate sensor shown in FIG. 1.

Herein, a case will be described in which the support system of the rotational-rate sensor shown in FIG. 1 is varied based on another design specification, and the mechanical frequency-gain characteristic of the support system is varied. FIG. 10 is a graphical representation, showing another mechanical frequency-gain characteristic of the supporting system of the rotational-rate sensor shown in FIG. 1. In FIG. 10, reference numeral 34 designates a transfer-characteristic curve of another supporting system (i.e., a mechanical system which is configured mainly by a crystal tuning-fork vibrator, a circuit portion, an airtight container and a silicone rubber) of the rotational-rate sensor shown in FIG. 1. Reference numeral 35 denotes a peak at a resonance frequency of the supporting-system transfer-characteristic curve 34, and 36 denotes the detuning frequency A (=fd−fs)=fω.

As the supporting-system transfer characteristic shown in FIG. 10, it is preferable that the peak 35 of the resonance frequency be 300 Hz or higher, and 600 Hz or lower. More preferably, it should be 500 Hz. In addition, it is preferable that the detuning frequency A described using FIG. 5A to FIG. 5C be set at 1 kHz or higher, and 2 kHz or lower, the point 24 which indicates a cut-off frequency of the low-pass filter be set at 100 Hz or lower, and the order of the low-pass filter be set at substantially three or more. In this case, the rotational-rate sensor becomes resistant to an applied impact. At the same time, the reliability of an output within a frequency range where the sensor conducts a detection becomes higher, because a beat component can be efficiently suppressed which is easily produced at the frequency of the applied rotational-rate.

Figure 11:
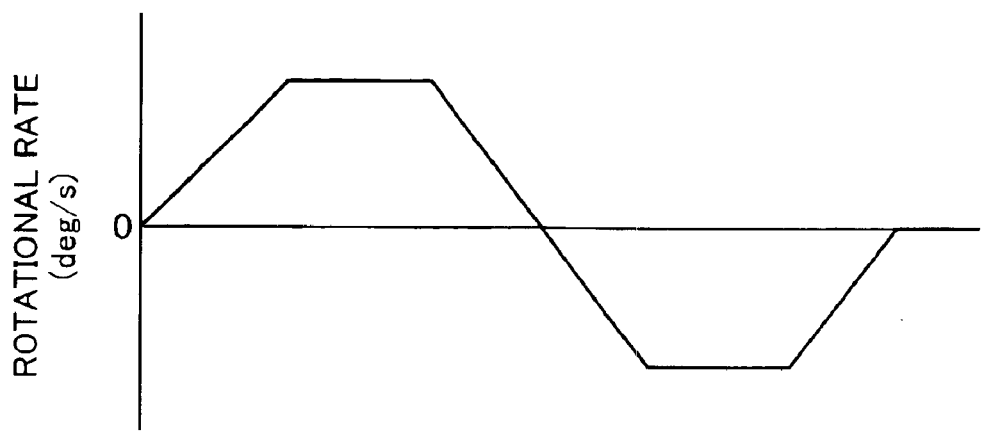
FIG. 11 is a graphical representation, showing the characteristic of a change in a rotational rate which is applied to the rotational-rate sensor shown in FIG. 1.
Figure 12:
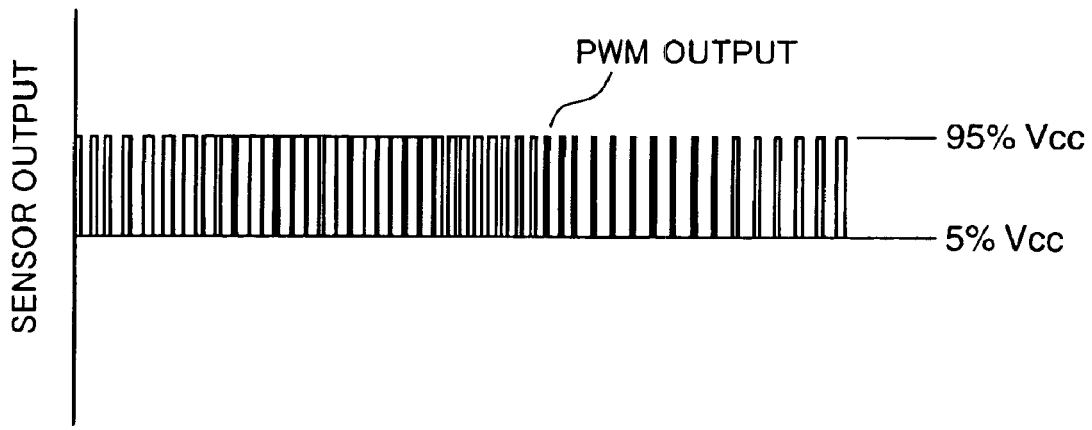
FIG. 12 is a graphical representation, showing a PWM output which is outputted from the circuit portion of the rotational-rate sensor according to the rotational-rate change shown in FIG. 11.

FIG. 11 is a graphical representation, showing the characteristic of a change in a rotational rate which is applied to the rotational-rate sensor shown in FIG. 1. FIG. 12 is a graphical representation, showing a PWM output which is outputted from the circuit portion of the rotational-rate sensor according to the rotational-rate change shown in FIG. 11.

When the rotational rate shown in FIG. 11 is applied to the rotational-rate sensor 1 shown in FIG. 1, an analog output is produced from the rotational-rate sensor 1. According to this output, a PWM-form output is generated whose duty ratio changes at such a pulse width as shown in FIG. 12. This is because the circuit portion 8 of the rotational-rate sensor 1 includes a pulse-width processing-conversion portion (not shown). In this case, a digital output is sent out from the circuit portion 8 which adjusts and outputs a signal which corresponds to a rotational rate. This makes it possible to process this output easily, using a microcomputer. Besides, the digital output is a PWM form, and thus, this PWM output can be processed using one digital port, without using an A/D converter.

Figure 13:
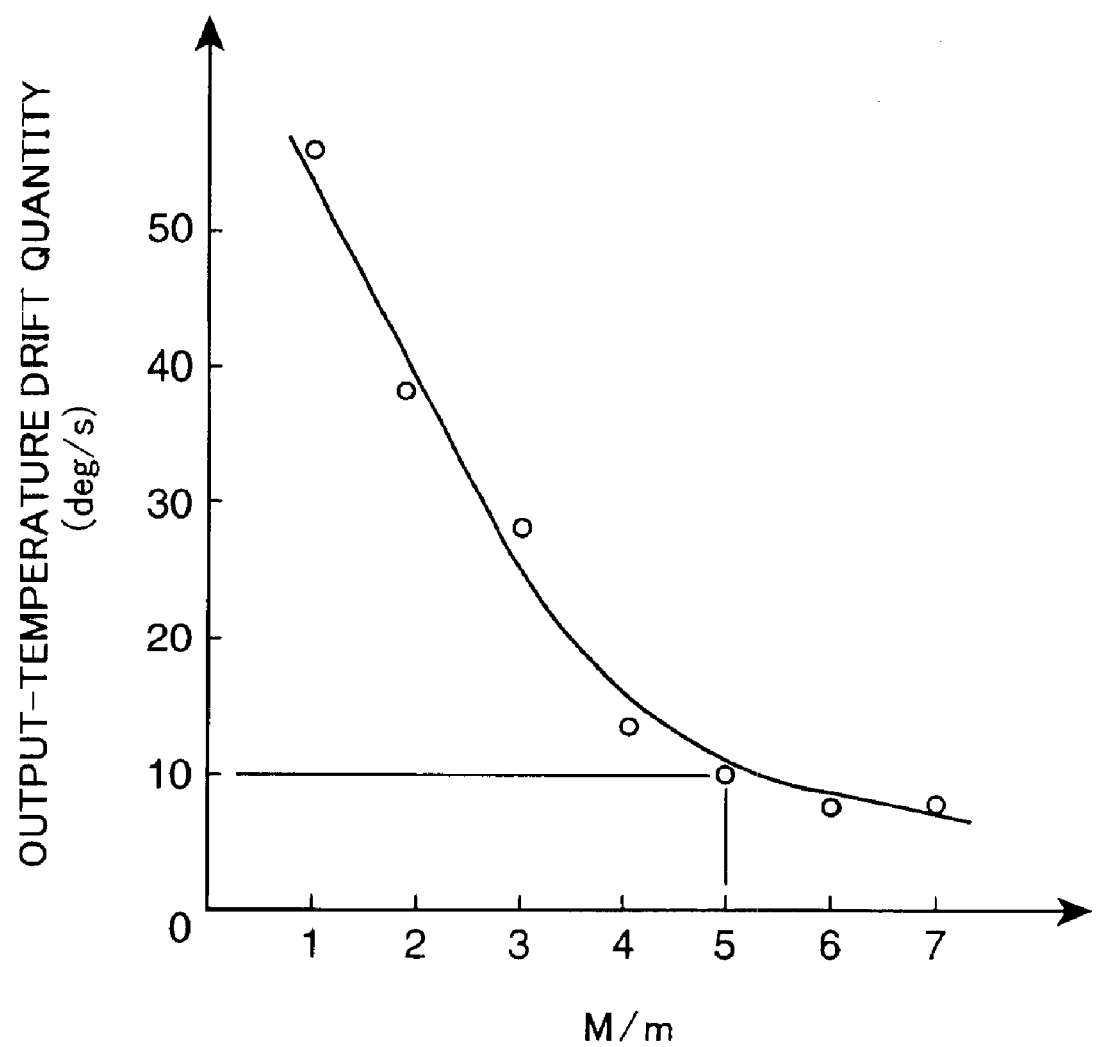
FIG. 13 is a graphical representation, showing the relation between the mass ratio of the mass of the crystal tuning-fork vibrator of the rotational-rate sensor shown in FIG. 1 to the total mass of the circuit portion and the airtight container, and an output-temperature drift quantity.

FIG. 13 is a graphical representation, showing the relation between the mass ratio of the mass of the crystal tuning-fork vibrator of the rotational-rate sensor shown in FIG. 1 to the total mass of the circuit portion and the airtight container, and an output-temperature drift quantity. The horizontal axis of FIG. 13 is a mass ratio M/m which is obtained by dividing a total mass M of the circuit portion 8 and the airtight container 2 by a mass m of the crystal tuning-fork vibrator 6. The vertical axis shows an output-temperature drift quantity (deg/sec) of the rotational-rate sensor 1.

As shown in FIG. 13, if the mass ratio M/m becomes 5.0 or more, the vibration of the crystal tuning-fork vibrator 6 stabilizes and a leakage vibration quantity is reduced. Therefore, the output-temperature drift quantity of the rotational-rate sensor 1 is also reduced to 10 deg/sec or less.

As described above, according to this embodiment, even though the crystal tuning-fork vibrator 6 is made smaller as the rotational-rate sensor 1 becomes smaller, the dispersion of a rotational-rate sensor's products cannot deteriorate its characteristics. In addition, a micro-miniature rotational-rate sensor which is highly reliable even if a disturbance acceleration or an impact is applied can be provided at a moderate price. Especially, a rotational-rate sensor which is mounted on a surface can be provided at a low price.

Herein, according to this embodiment, an example is mentioned in which a silicone rubber is used as the elastic body. However, the present invention is not necessarily limited to this, and thus, various such components can be used.

For example, a sheet of rubber may also be used in which a fine metal wire is buried so that it is electrically conductive in its thickness directions. In that case, the electrical conduction between this sensor and a substrate can be secured, only by pressing and welding the sensor on the substrate, without using a connection means such as soldering. This makes it possible to streamline its production.

Furthermore, urethane, or silicone which has a cavity, may also be used. In that case, an impact absorbing effect becomes greater. Moreover, a magnetic body, or an elastic material which has a magnet, may also be used. In that case, it can be firmly attached to a magnetic metal body, such as the body of an automobile and the surface of a motor. In addition, a sheet may also be used which is made of fibrous glass or resin. In that case, an internal loss in the elastic body becomes extremely great, thereby making greater an impact absorbing effect.

Furthermore, the elastic body may also have a laminated structure. If the elastic body has a laminated structure, a transfer impedance between layers becomes discontinuous. Thus, a vibration is reflected, thereby making greater a vibration damping effect. Besides, the elastic body may also be thinly attached onto the surface of the airtight container (e.g. it is attached, thinner than the thickness of the airtight container, onto the surfaces except the bottom surface of the airtight container). In that case, an impact or a vibration can be lightened which is given when other members come into contact and interferes with the airtight container.

Moreover, according to this embodiment, an example is mentioned in which a crystal tuning-fork vibrator is used as the detecting element. However, the present invention is not necessarily limited to this, and thus, various such components can be used.

For example, a tuning-fork vibrator of the one-end closed type may also be used which is formed out of a silicone plate that includes a PZT-system piezo-electric film on its surface. In that case, a support portion of the one-end closed tuning-fork vibrator can be easily formed. In addition, an H-type vibrator may also be used. In that case, an unnecessary signal from a drive portion to a detection portion can be kept from leaking. Besides, a beam-type vibrator which is formed out of a silicone plate using etching may also be used. In that case, the sensor becomes easy to make smaller. Moreover, a ring-shaped vibrator which is formed out of a silicone plate using etching may also be used. In that case, a mechanical Q-value becomes greater.

Furthermore, a vibrating element may also be used which includes a resonance-type vibrator arm, a base portion, a beam that supports the base portion, and a rectangular frame body that supports the beam which are unitedly formed out of a silicone substrate, using etching; and in which a PZT-system piezo-electric film whose thickness is 1 $\mu$m or more and 5 $\mu$m or less is formed on the main surface of the arm, using evaporation or the like. In that case, the sensor becomes thinner, and at the same time, becomes more precise. In addition, it is preferable that a circuit be unitedly formed on one and the same surface of the silicone substrate. In that case, the sensor becomes easy to make smaller.

Moreover, a vibrating element may also be used which is made of ceramics and is shaped like a prism or a column. In that case, the sensitivity at which the sensor can detect a rotational rate becomes higher. Besides, a vibrating element may also be used in which a surface acoustic wave is used. In that case, the sensor becomes far thinner.

In addition, according to this embodiment, an example is mentioned in which the detecting element and the circuit portion are disposed apart from each other. However, the present invention is not necessarily limited to this. For example, the circuit portion may also be unitedly formed on one and the same surface of a one-end closed tuning-fork vibrator which is formed out of a silicone plate. In that case, the sensor becomes easier to make smaller.

(Second Embodiment)

Figure 14:
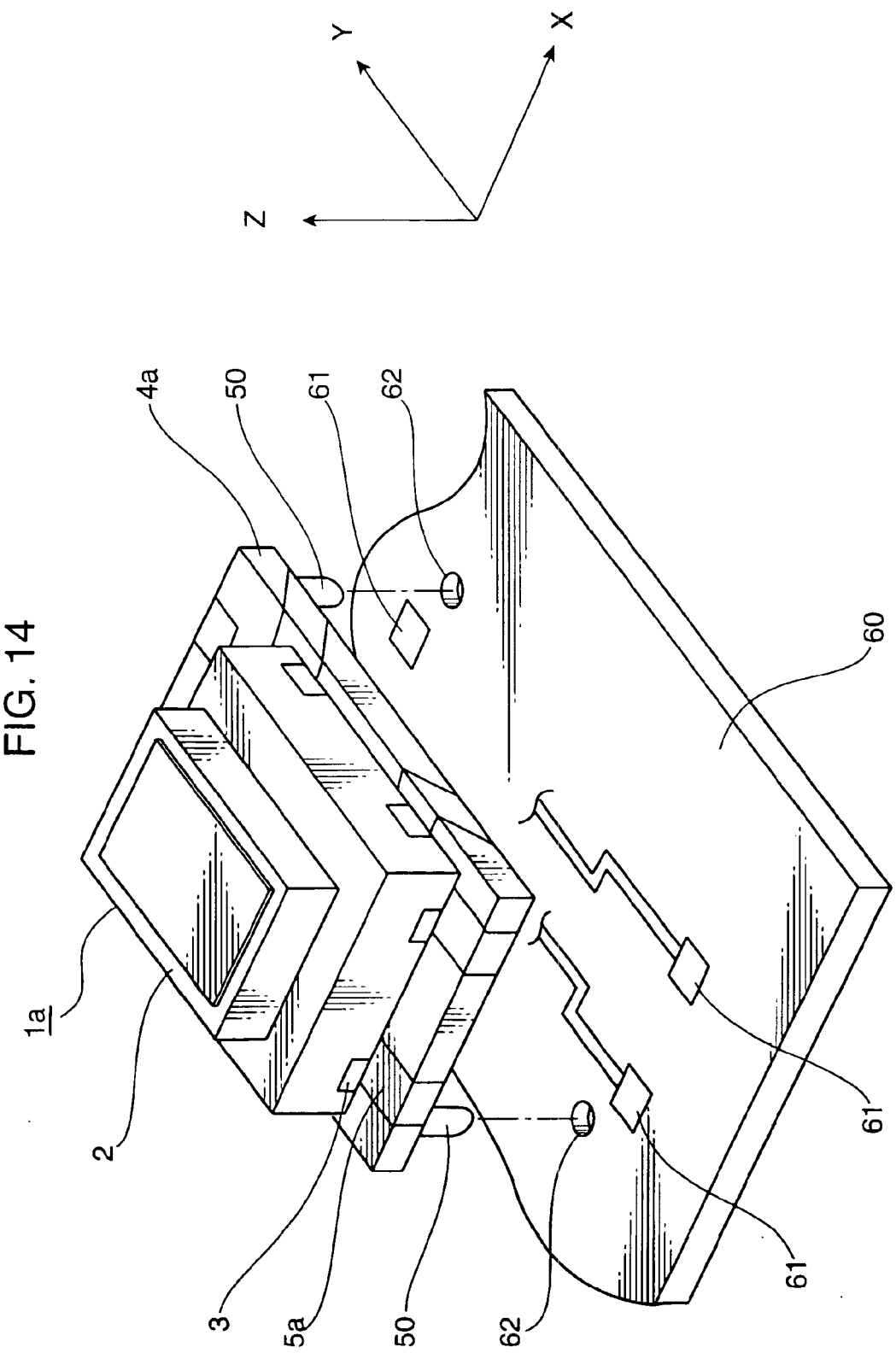
FIG. 14 is a perspective view of a rotational-rate sensor according to a second embodiment of the present invention.

FIG. 14 is a perspective view of a rotational-rate sensor according to a second embodiment of the present invention. In FIG. 14, the parts which have the same configuration as those in FIG. 1 are given their identical reference numerals and characters. Hence, their detailed description is omitted, and thus, only different parts are described in detail.

In a rotational-rate sensor 1a shown in FIG. 14, a silicone rubber 4a is configured by a silicone rubber which extends in the Y-axis direction from the silicone rubber 4 shown in FIG. 1. It functions as the elastic body, in the same way as according to the first embodiment. A protrusion 50 is provided in the silicone rubber 4a. A hole 62 for positioning and storing the protrusion 50 is formed in a mounting substrate 60. In addition, a conductor portion 5a is provided in the silicone rubber 4a. The pad electrode 3 is connected via the conductor portion 5a to a conductor pattern 61 which is provided in the mounting substrate 60, with the protrusion 50 kept inserted into the hole 62.

As described above, according to this embodiment, the protrusion 50 and the hole 62 are provided, and thus, if the protrusion 50 is inserted into the hole 62, the rotational-rate sensor 1a can be precisely positioned in the mounting substrate 60. This prevents the rotational-rate sensor 1a from being connected to a substrate, with its position shifted.

(Third Embodiment)

Figure 15:
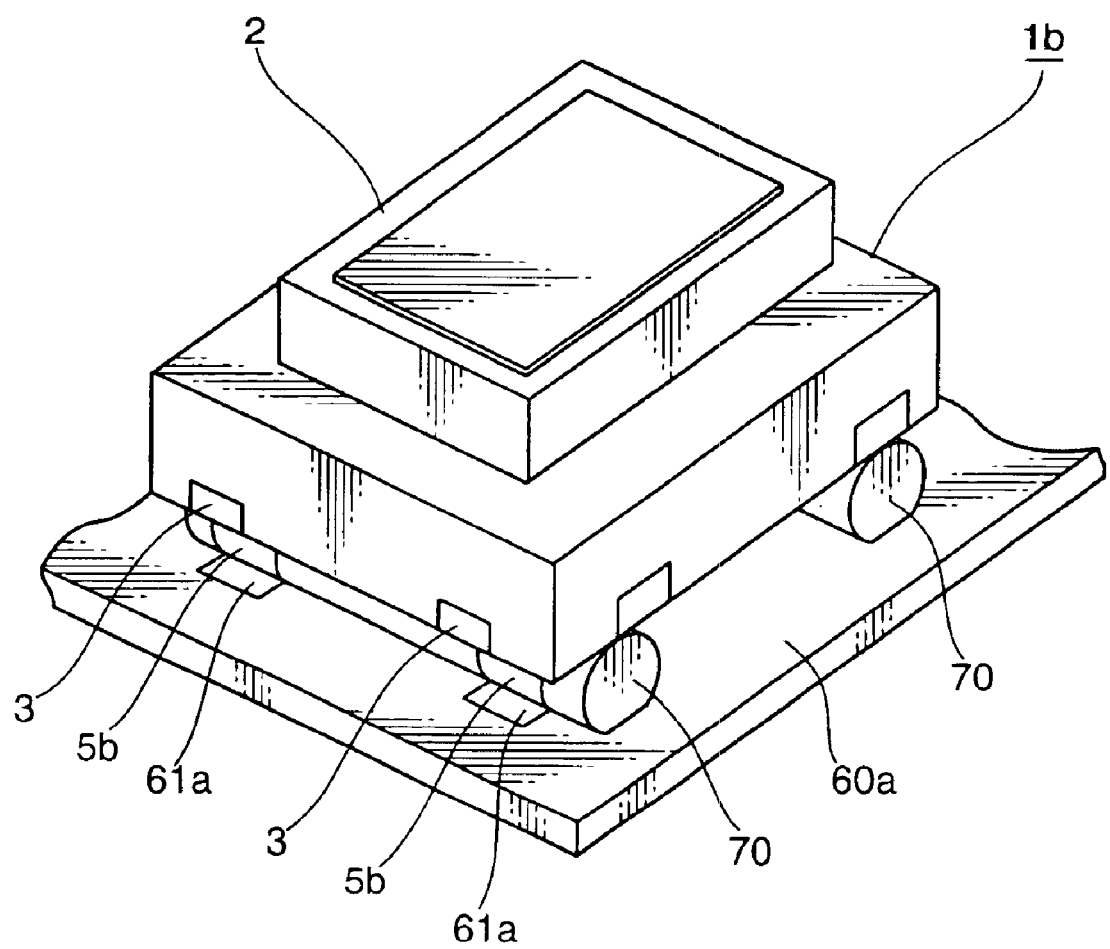
FIG. 15 is a perspective view of a rotational-rate sensor according to a third embodiment of the present invention.

FIG. 15 is a perspective view of a rotational-rate sensor according to a third embodiment of the present invention. In FIG. 15, the parts which have the same configuration as those in FIG. 1 are given their identical reference numerals land characters. Hence, their detailed description is omitted, and thus, only different parts are described in detail.

In a rotational-rate sensor 1b shown in FIG. 15, a silicone rubber 70 is attached to the bottom surface of the airtight container 2. The silicone rubber 70 is glued to a mounting substrate 60a. The silicone rubber 70 is configured by a silicone rubber which is a columnar body whose section is circular. It functions as the elastic body, in the same way as according to the first embodiment. On the surface of the silicone rubber 70, a conductor portion 5b is provided which connects the pad electrode 3 that is made of gold or the like and an external electrode 61a that is provided in the mounting substrate 60a.

According to the above described configuration of this embodiment, when the rotational-rate sensor 1b is mounted in the mounting substrate 60a, a space is formed between the rotational-rate sensor 1b and the mounting substrate 60a. In this space, various parts can be mounted, thereby improving the efficiency of mounting.

Herein, the sectional shape of the silicone rubber 70 is not limited especially to this example. Another such shape may also be used, such as an elliptic one. In addition, the shape of the silicone rubber is not limited especially to this example, either. Various shapes may also be used, such as a spherical body. Moreover, a silicone rubber is used as the elastic body, however it is not limited especially to this example. Various materials can be used, so long as they are elastic.

(Fourth Embodiment)

Figure 16:
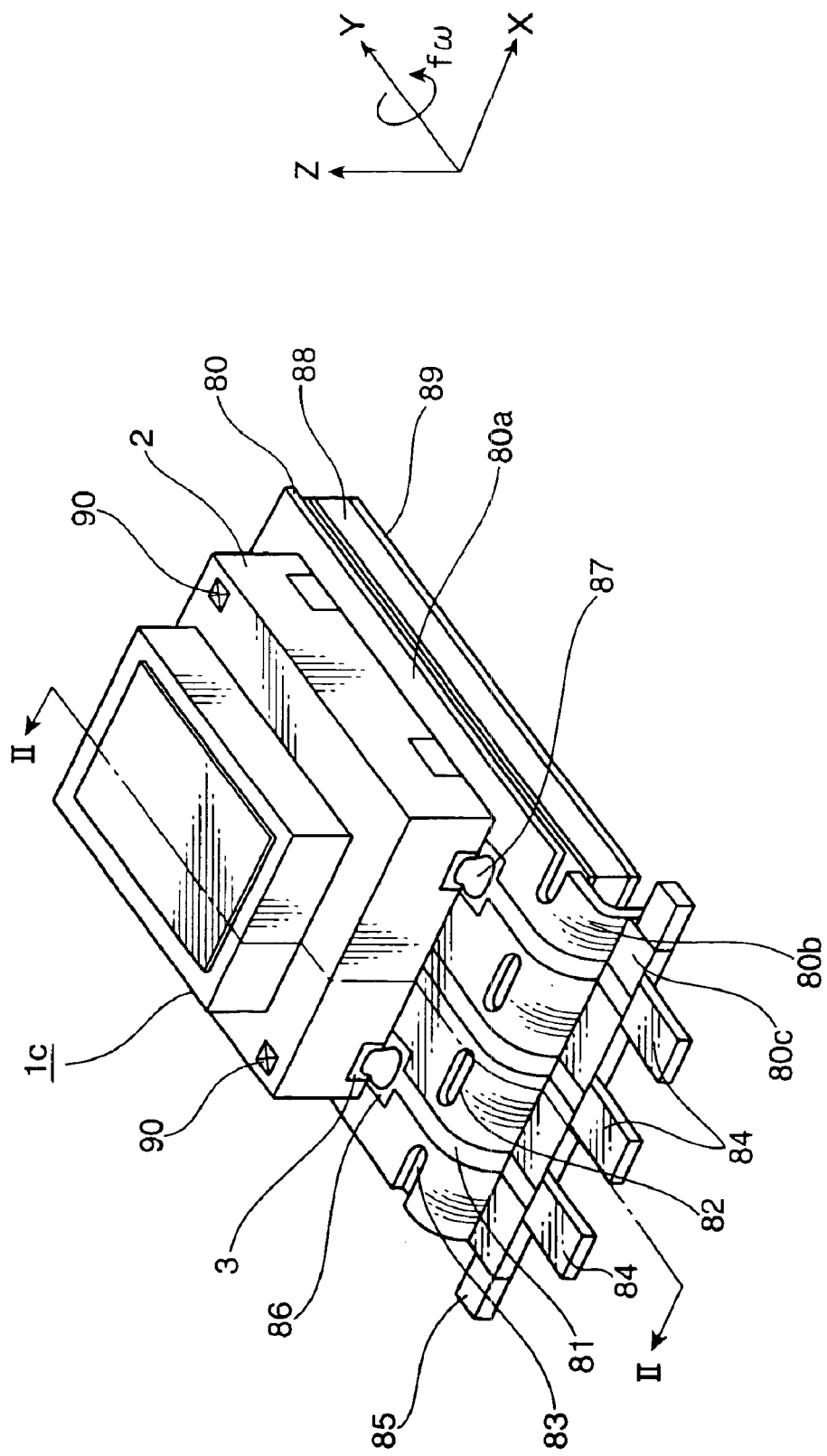
FIG. 16 is a perspective view of a rotational-rate sensor according to a fourth embodiment of the present invention.
Figure 17:
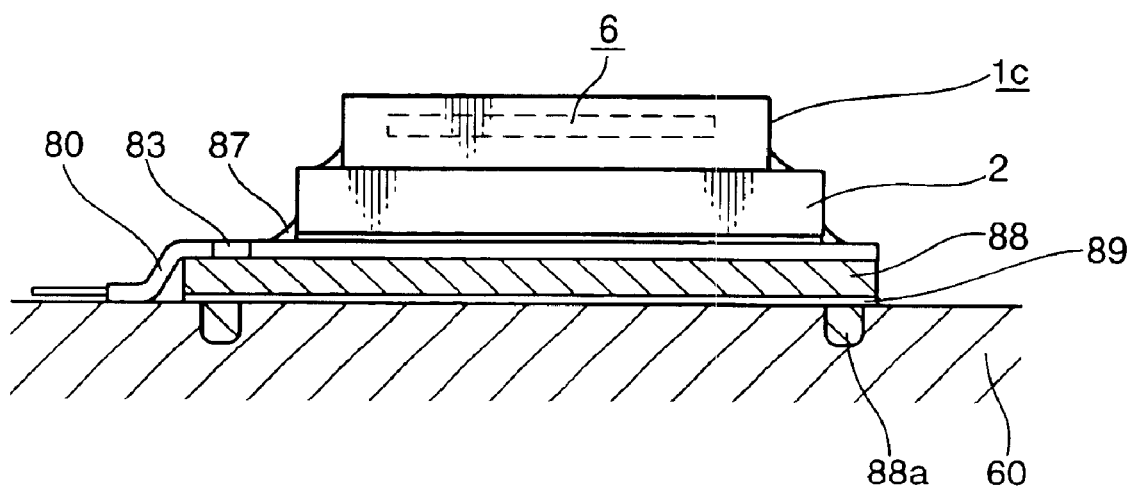
FIG. 17 is a partially sectional view of the rotational-rate sensor shown in FIG. 16, seen along an II—II line.

FIG. 16 is a perspective view of a rotational-rate sensor according to a fourth embodiment of the present invention. FIG. 17 is a partially sectional view of the rotational-rate sensor shown in FIG. 16, seen along an II—II line. In FIG. 16 and FIG. 17, the parts which have the same configuration as those in the first to third embodiments are given their identical reference numerals and characters. Hence, their detailed description is omitted, and thus, only different parts are described in detail.

In a rotational-rate sensor 1c shown in FIG. 16 and FIG. 17, a flexible substrate 80 includes: a mounting portion 80a on which the rotational-rate sensor 1c is mounted; a shifting portion 80b for drawing a wiring from the mounting portion 80a; and a terminal portion 80c which is connected to the mounting substrate 60.

A conductive pattern 81 is provided on the flexible substrate 80. A first conductor piece 84 is connected to the conductive pattern 81 on the terminal portion 80c. The first conductor piece 84 is a plate-shaped metal terminal, and is joined to the terminal portion 80c, using resistance welding or ultrasonic welding. In this case, the terminal portion 80c becomes stronger, and can fit into a connector. Herein, the conductor piece is not limited especially to the above described example. A wire-shaped metal terminal may also be used. In that case, the same advantages can be obtained. In addition, a flexible wire-shaped or plate-shaped at metal terminal may also be used as the first conductor piece. In that case, in the terminal portion 80c, the flexible wire-shaped or plate-shaped metal terminal is connected to the conductive pattern. Thereby, a mechanical resonance characteristic can be controlled, thus realizing a sensor which is stronger against an impact.

On the flexible substrate 80, a connection pad 86 is provided which corresponds to the pad electrode 3. The pad electrode 3 and the connection pad 86 are electrically connected, using a solder 87. Herein, in order to electrically connect the pad electrode 3 and the connection pad 86, the solder 87 is used, but a conductive adhesive may also be used.

In the shifting portion 80b, a hole 82 and a notch 83 are formed. The notch 83 is parallel to the detection axis where a rotational rate is detected. The plurality of holes 82 are formed in the shifting portion 80b. Therefore, using the holes 82, the sensor is sewn on a cloth or a glove, and thus, for example, the movement of people or their hands can be detected. Besides, the notch 83 is formed in the shifting portion 80b, and thereby, a vibration which is leaked from the rotational-rate sensor 1c can be prevented from being propagated through the flexible substrate 80. In addition, the vibration-insulating function of a silicone rubber 88 (described later) can be prevented from being damaged by the rigidity or the like of the shifting portion 80b of the flexible substrate 80. Hence, despite such a simple configuration, a vibration-insulating effect can be obtained. Besides, a flexible substrate can be shortened, thus making the sensor compact. Herein, instead of the notch 83, a narrow portion may also be used. In that case, a thin portion is formed in the shifting portion 80b, which presents the same advantages.

In the terminal portion 80c, a second conductor piece 85 is provided which positions and fixes the flexible substrate 80 on which the rotational-rate sensor 1c is mounted in the mounting substrate 60. The second conductor piece 85 is used as a reinforcement, so that a mechanical stress cannot be directly applied to the first conductor piece 84 which is soldered on the mounting substrate 60. This keeps the first conductor piece 84 from being disconnected. Or, it prevents a crack in the soldering part of the first conductor piece 84 which is fixed on the mounting substrate 60. In addition, the second conductor piece 85 as a terminal for positioning and fixing is located near the terminal portion 80c. Thereby, a mechanical load on the terminal portion 80c which is subject to an electrical connection can be lightened. In addition, the terminal portion 80c itself can be more precisely positioned.

In the airtight container 2, a mark 90 for recognition is provided. The recognition mark 90 is used to lessen an angular shift at the time when the rotational-rate sensor 1c is precisely mounted. The airtight container 2 has a substantially rectangular-parallelepiped shape, and the recognition mark 90 at the time of mounting is made on the upper surface of the airtight container 2. This keeps down an angular shift at the time when it is automatically mounted.

The silicone rubber 88 is attached to the flexible substrate 80. At the time when it is mounted on the mounting substrate 60, it functions as the support member which supports the flexible substrate 80 and the rotational-rate sensor 1c. In addition, it also functions as a vibration-insulating member. In the silicone rubber 88, a protrusion 88a is provided which is made of silicone rubber, and an adhesive layer 89 is also provided which fixes the silicone rubber 88 to the mounting substrate 60. The silicone rubber 88 functions as the elastic body, in the same way as according to the above described embodiments. The protrusion 88a and the adhesive layer 89 function as the fixing member. Herein, the fixing member is not limited especially to the above described example. A magnet such as a magnetic sheet may also be used. Using an adhesive layer or a magnet, the sensor can be simply and efficiently fixed on the mounting substrate 60.

To each first conductor piece 84, there are allocated a power source, a ground, and a PWM output (or an analog output) which changes a duty ratio according to a rotation and outputs it. Preferably, the first conductor piece 84 to which a power supply is assigned should not be adjacent to the first conductor piece 84 to which a ground is assigned, if the sensor's reliability is taken into account when it is designed.

Figure 18:
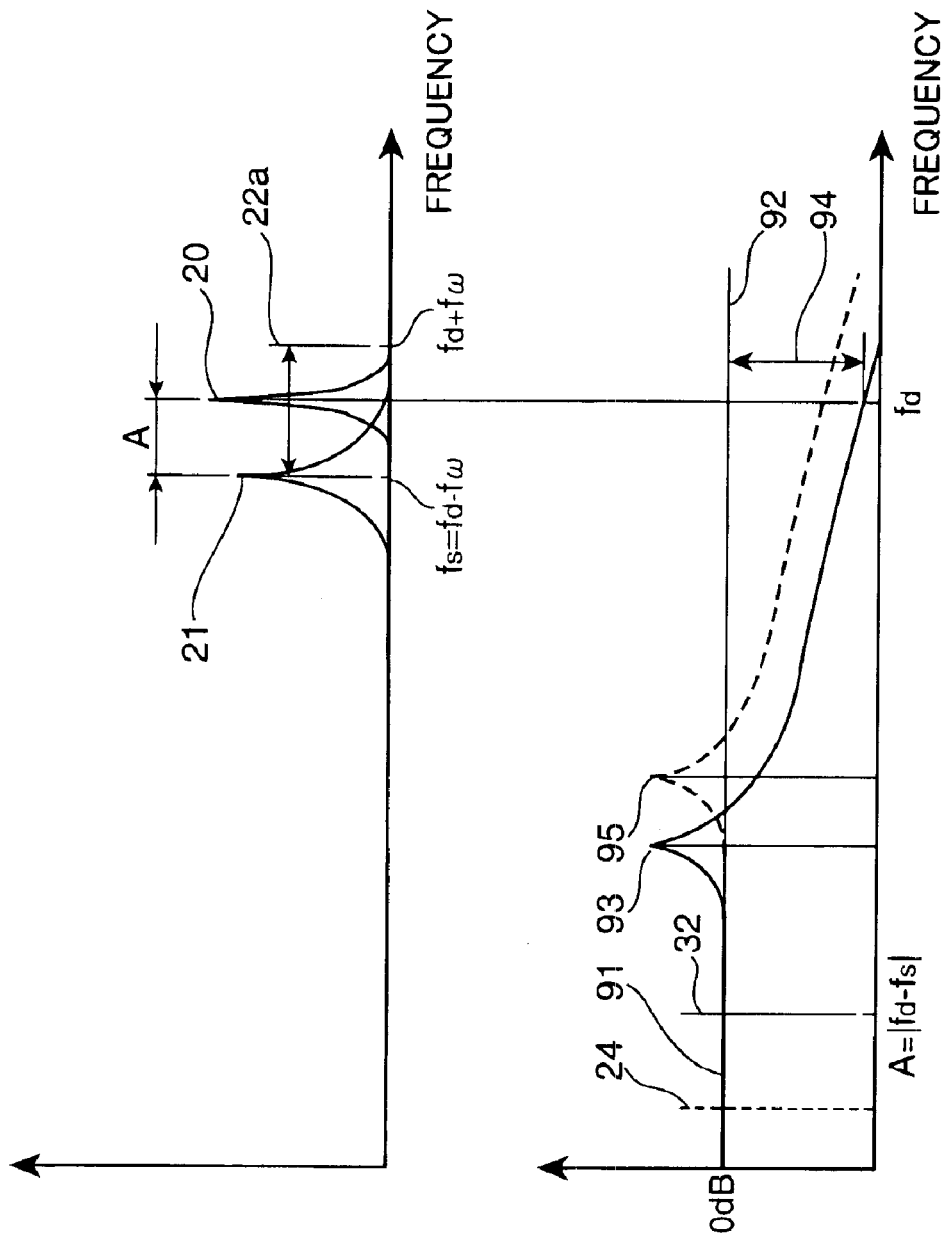
FIG. 18A is a graphical representation, showing a resonance characteristic of a crystal tuning-fork vibrator of the rotational-rate sensor shown in FIG. 16.
FIG. 18B is a graphical representation, showing a mechanical frequency-gain characteristic of a supporting system of the rotational-rate sensor shown in FIG. 16.
Figure 19:
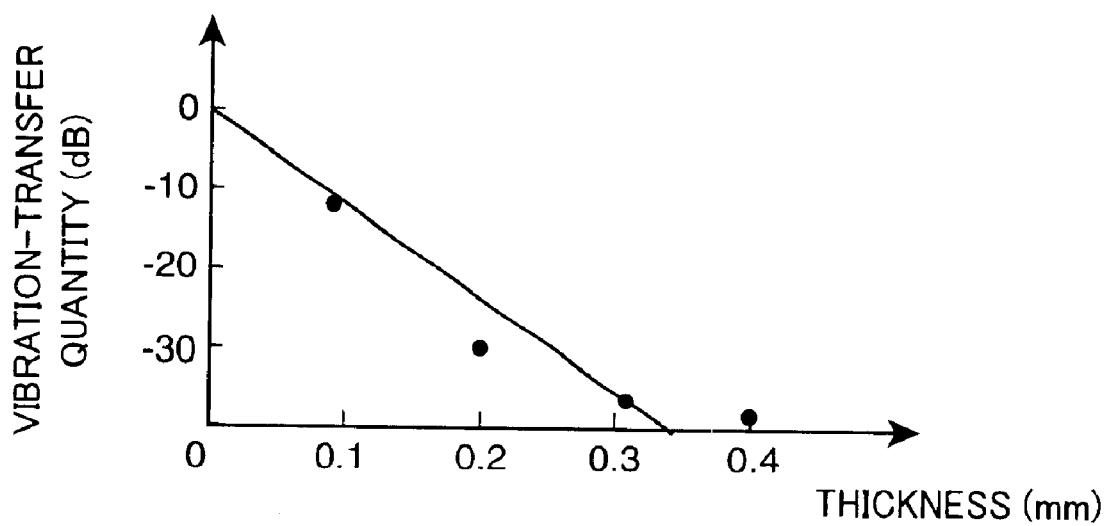
FIG. 19 is a graphical representation, showing the relation between the thickness of a silicone rubber and a vibration-transfer quantity.

FIG. 18A is a graphical representation, showing a resonance characteristic of a crystal tuning-fork vibrator of the rotational-rate sensor shown in FIG. 16. FIG. 18B is a graphical representation, showing a mechanical frequency-gain characteristic of a supporting system of the rotational-rate sensor shown in FIG. 16. FIG. 19 is a graphical representation, showing the relation between the thickness of a silicone rubber and a vibration-transfer quantity.

In FIG. 18A and FIG. 18B, reference numeral 91 denotes a transfer-characteristic curve of a supporting system (i.e., a mechanical system which is configured mainly by the crystal tuning-fork vibrator 6, the circuit portion 8, the airtight container 2, the flexible substrate 80, the silicone rubber 88, the protrusion 88a and the adhesive layer 89) of the rotational-rate sensor 1c; 92, a level of 0 dB in the supporting-system transfer-characteristic curve 91; 93, a first peak at a resonance frequency in the supporting-system transfer-characteristic curve 91; 94, an attenuation value from the level 92 of 0 dB; 95, a second peak which is shifted from the peak 93; 24, the point which indicates a cut-off frequency of the low-pass filter; and 32, the detuning frequency A (=fd−fs)=fω.

As shown in FIG. 18A and FIG. 18B, using the silicone rubber 88 which has a vibration-insulating effect, within a high-frequency range, a vibration-transfer quantity at and near the resonance frequency (fd) 20 in the drive directions of the crystal tuning-fork vibrator 6 (not shown) can be kept down so that it becomes the attenuation value 94 from the level 92 of 0 dB shown by a broken line. This attenuation value 94 reduces a vibration leakage, thereby lightening an influence by a leaked vibration.

The first peak 93 is determined according to the loss, hardness, thickness and shape of the silicone rubber 88, or the mass m, external shape and the like of the crystal tuning-fork vibrator 6. It can be designed at any frequency, according to various purposes, such as avoiding interference with the resonance frequency (fd) 20. For example, if the silicone rubber 88 is hardened, the first peak 93 moves to the side of the second peak 95 whose frequency is higher. Furthermore, as shown in FIG. 19, if the thickness of the silicone rubber 88 is varied, the vibration-transfer quantity changes. This makes it possible to change the attenuation value 94 shown in FIG. 18B.

As the supporting-system transfer characteristic shown in FIG. 11B, the resonance frequency of the first peak 93 is 2 kHz or higher, and 4 kHz or lower. Preferably, it should be 2 kHz. In addition, it is preferable that the detuning frequency A be set at 200 Hz or higher, and 500 Hz or lower, the point 24 which indicates a cut-off frequency of the low-pass filter be set at 100 Hz or lower, and the order of the low-pass filter be set at substantially three or more. In this case, the rotational-rate sensor becomes resistant to an applied impact. At the same time, the reliability of an output within a frequency range where the sensor conducts a detection becomes extremely high, because a beat component can be efficiently suppressed which is easily produced at the frequency of the applied rotational-rate.

Herein, the supporting-system transfer characteristic is not limited especially to the above described example. The supporting-system transfer characteristic shown in FIG. 10 may also be used as the transfer characteristic of the supporting system (i.e., a mechanical system which is configured mainly by the crystal tuning-fork vibrator 6, the circuit portion 8, the airtight container 2, the flexible substrate 80, the silicone rubber 88, the protrusion 88a and the adhesive layer 89) of the rotational-rate sensor 1c. In that case, the same advantages can be obtained.

According to the above described configuration of this embodiment, the degree of freedom becomes greater in the designing of a vibration separation. In addition, the sensor can be made smaller, more reliable and more precise.

(Fifth Embodiment)

Figure 20:
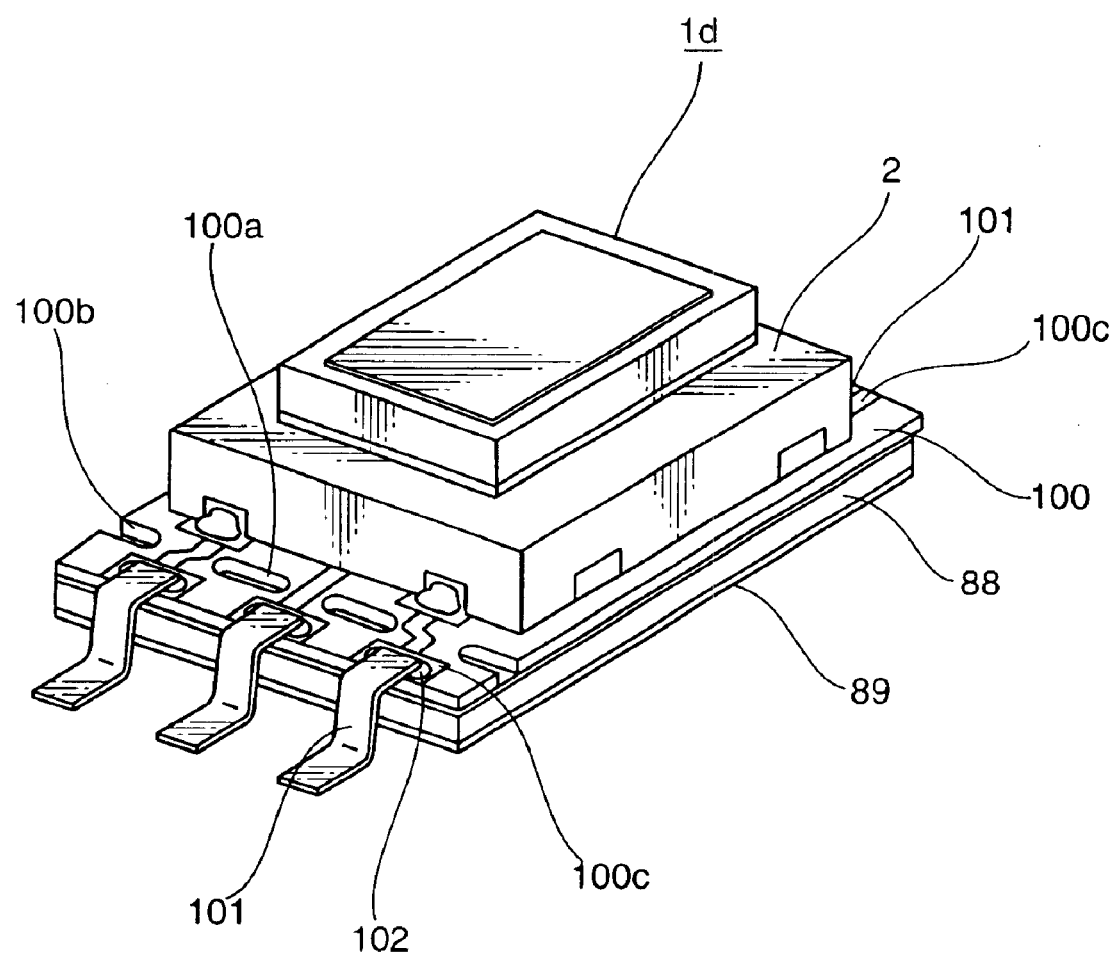
FIG. 20 is a perspective view of a rotational-rate sensor according to a fifth embodiment of the present invention.

FIG. 20 is a perspective view of a rotational-rate sensor according to a fifth embodiment of the present invention. In FIG. 20, the parts which have the same configuration as those in the first to fourth embodiments are given their identical reference numerals and characters. Hence, their detailed description is omitted, and thus, only different parts are described in detail.

In a rotational-rate sensor 1d shown in FIG. 20, a substrate 100 is made of glass epoxy, and functions as the support member. In the substrate 100, there are formed a hole 100a and a notch 100b. The notch 100b is used to make the substrate 100 partly less rigid, and also to make it difficult to propagate a vibration which travels via a drawn-out lead 101 from the outside and a vibration which leaks from the rotational-rate sensor 1d. On the substrate 100, there is provided a drawn-out pad 100c. Using a solder 102, the drawn-out pad 100c is soldered on the crank-shaped drawn-out lead 101.

Herein, in this embodiment, an example is described in which soldering is used for the connection of the drawn-out lead 101 and the drawn-out pad 100c. However, they can also be connected, using resistance welding or ultrasonic welding. In addition, an example is described in which the substrate 100 is made of glass epoxy. However, it may also be made of a molded resin, a ceramics-system material, or the like. Besides, a multi-layer substrate of the inner via-hole type may also be used.

Figure 21:
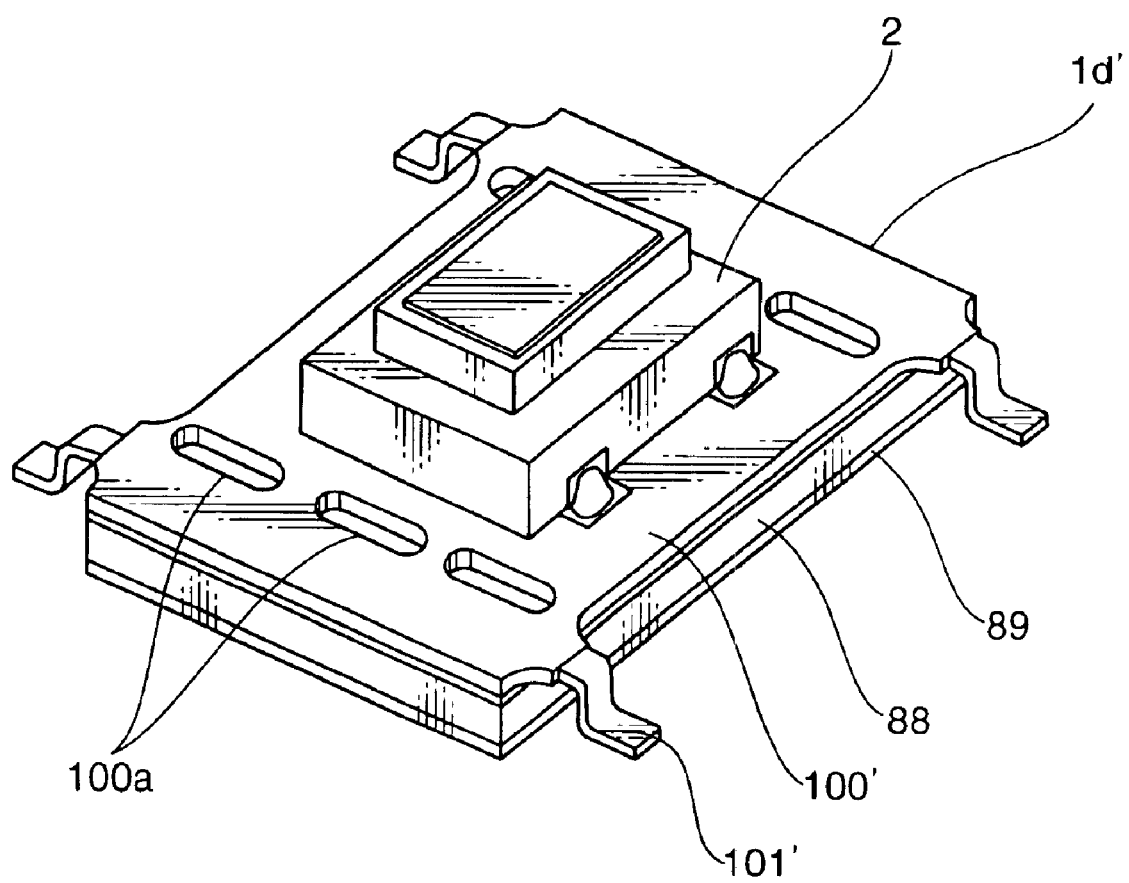
FIG. 21 is a perspective view of a rotational-rate sensor in which a substrate and a drawn-out lead are united.

Furthermore, the configuration of a substrate and a drawn-out lead are not limited especially to the above described example. As described later, they can be varied. FIG. 21 is a perspective view of a rotational-rate sensor in which a substrate and a drawn-out lead are united. In a rotational-rate sensor 1d' shown in FIG. 21, a substrate 100' and a drawn-out lead 101' are united. In this case, a rotational-rate sensor can be realized at a low cost.

(Sixth Embodiment)

Figure 22:
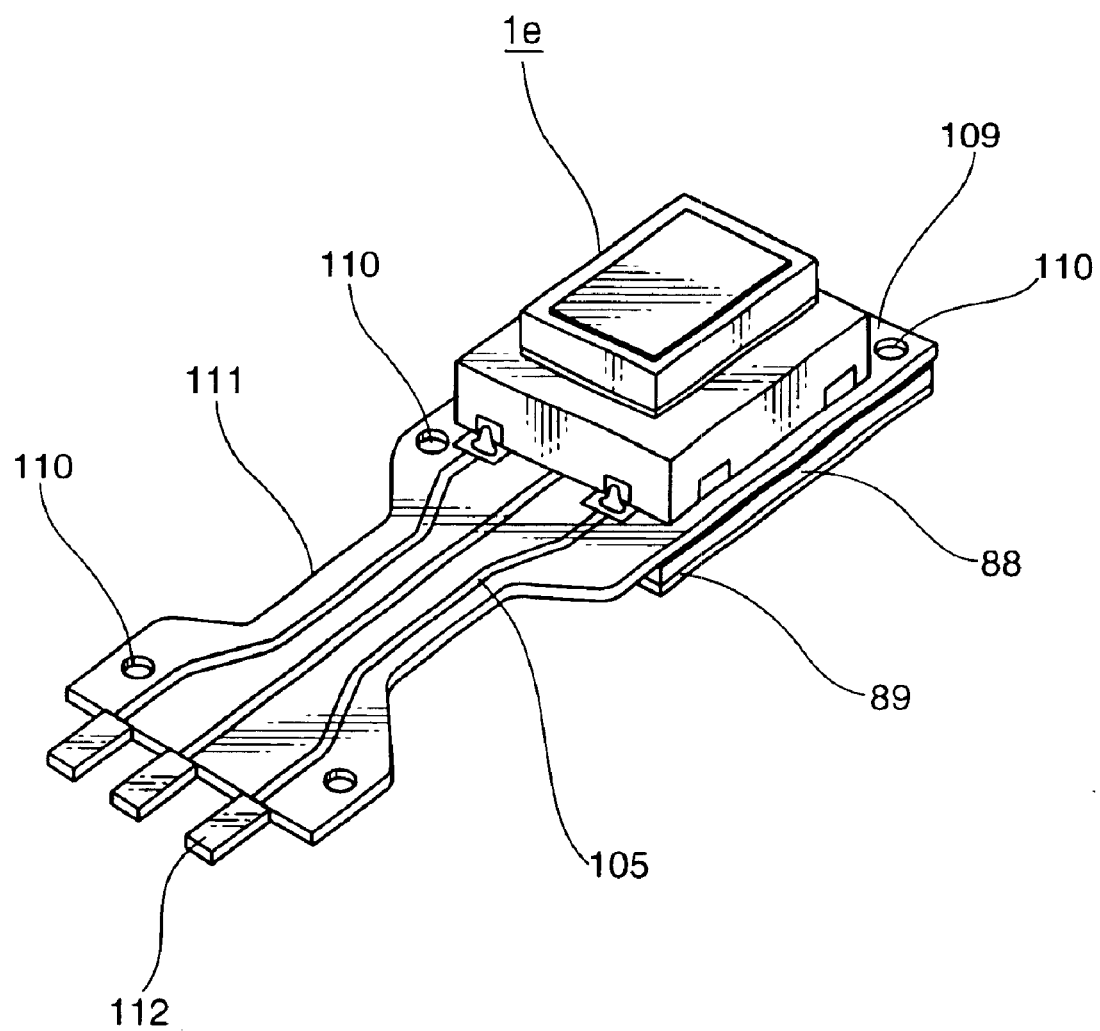
FIG. 22 is a perspective view of a rotational-rate sensor according to a sixth embodiment of the present invention.

FIG. 22 is a perspective view of a rotational-rate sensor according to a sixth embodiment of the present invention. In FIG. 22, the parts which have the same configuration as those in the first to fifth embodiments are given their identical reference numerals and characters. Hence, their detailed description is omitted, and thus, only different parts are described in detail.

In a rotational-rate sensor 1e shown in FIG. 22, a substrate 109 is formed by a flexible substrate. In the substrate 109, there are provided a conductor pattern 105 and a plurality of holes 110. In addition, a narrow portion 111 is formed at a part of the substrate 109 which extends long. The conductor pattern 105 on the substrate 109 is connected to a conductor piece 112.

According to the above described configuration of this embodiment, the substrate 109 extends long, and thus, the sensor can be more freely mounted on various objects. For example, the rotational-rate sensor 1e may also be attached to the wall surface of a case (not shown). Hence, it can be connected to a circuit substrate (not shown) which is apart from the substrate 109. In addition, the holes 110 are formed in the substrate 109, and thus, the sensor can be sewn on clothes, a shoe, or the like. Besides, it can also be fixed by allowing a guide pin (not shown) which is provided in another object to pass through the hole 110 and bending this guide pin. In that case, the rotational-rate sensor 1e can be easily attached and detached. Moreover, the narrow portion 111 is formed at a part of the substrate 109, and thus, a vibration-insulating effect can be maintained.

Figure 23:
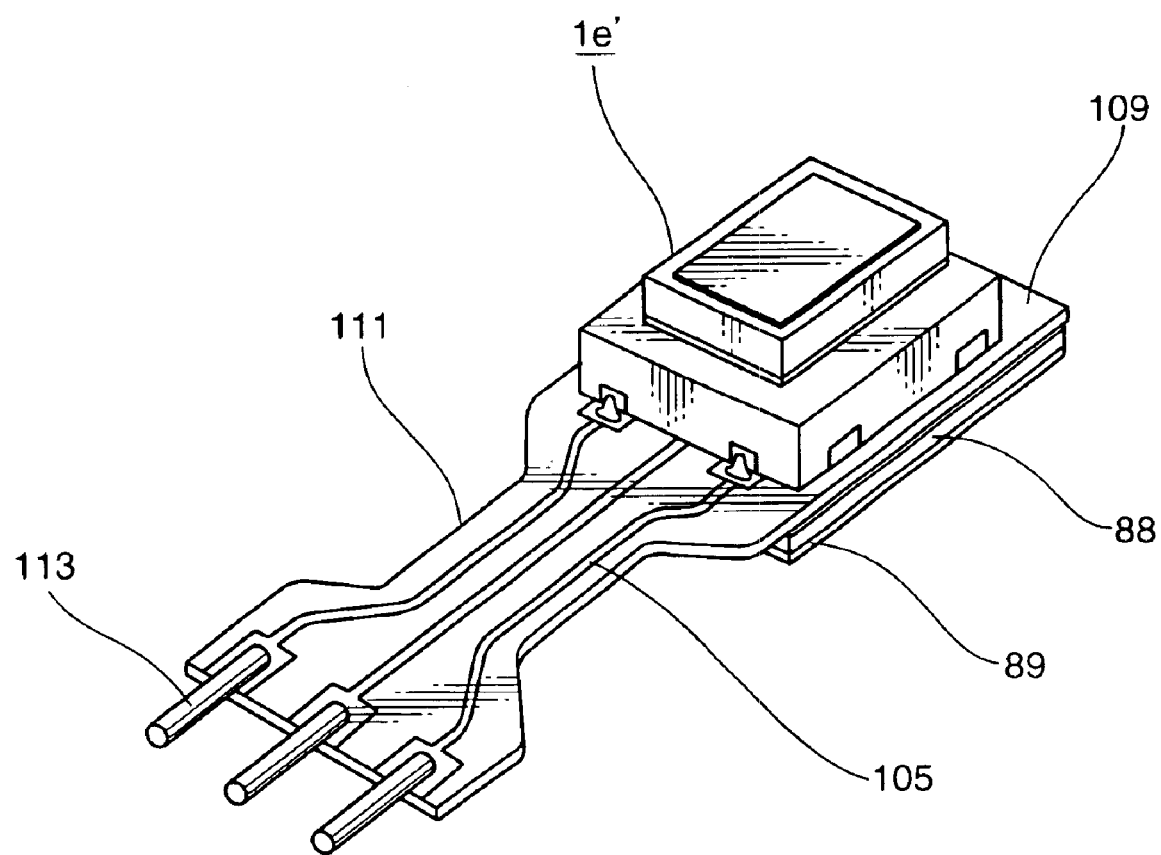
FIG. 23 is a perspective view of a rotational-rate sensor in which wire-shaped conductor pieces are provided.

Herein, the conductor piece is not limited especially to the above described example. As described later, it can be varied. FIG. 23 is a perspective view of a rotational-rate sensor in which wire-shaped conductor pieces are provided. In a rotational-rate sensor 1e' shown in FIG. 23, instead of the conductor piece 112 shown in FIG. 22, a wire-shaped conductor piece 113 is used. In this case, the conductor piece 113 is shaped like a wire, and thus, it can fit easily into a connector.

Furthermore, in this embodiment, an example is described in which the flexible substrate is used. However, a hard substrate can also be used which is made of glass epoxy and has a thickness of 0.1 mm or more and 1 mm or less. This is provided by suitably combining some of a notch, a plurality of holes, a narrow portion and a thin portion, and forming them in the shifting portion of the support member. In that case, the airtight container can be mounted more easily. In addition, various electric parts can be mounted, and a wire-bonding connection with another substrate can be made.

(Seventh Embodiment)

Figure 24:
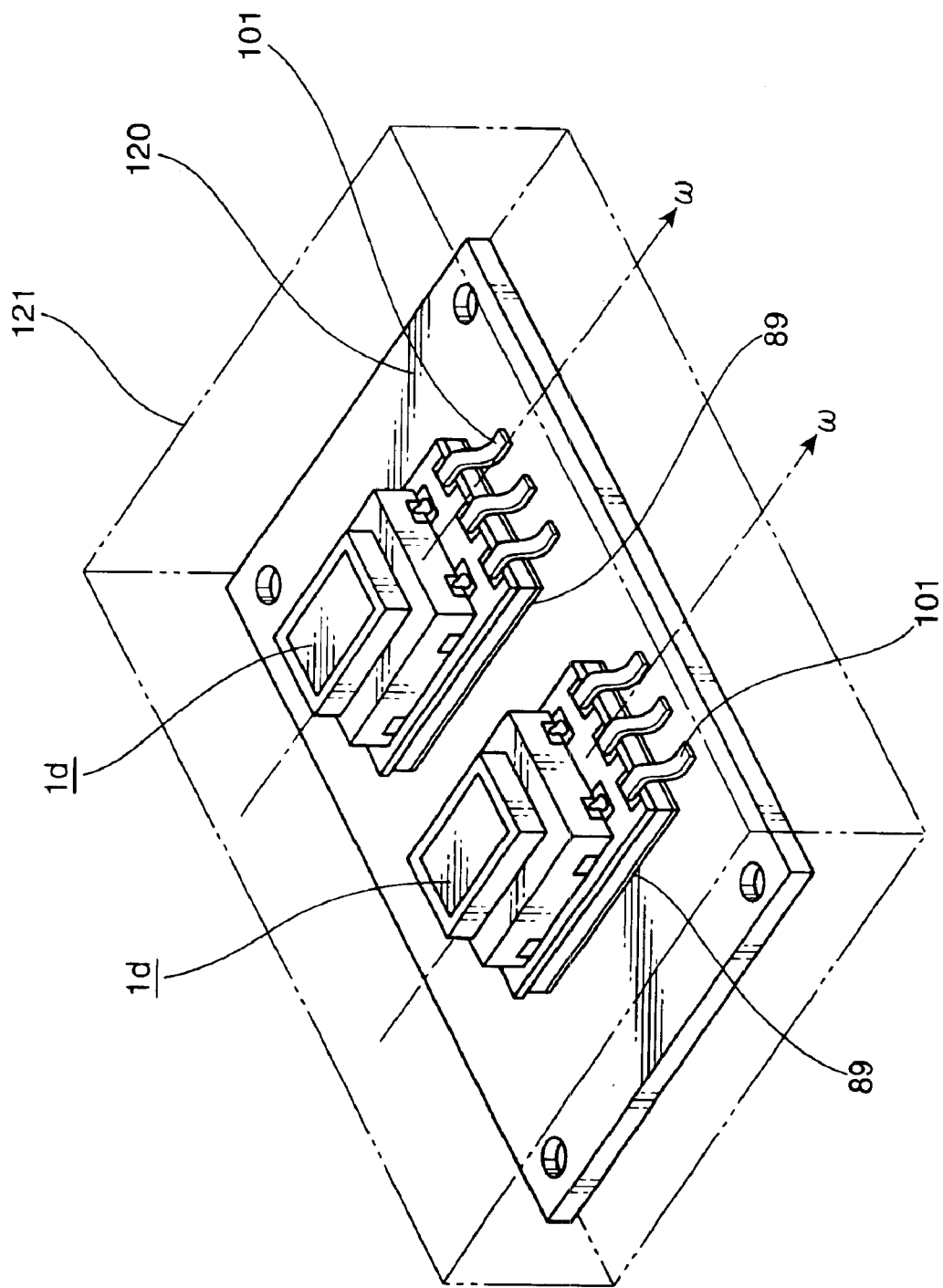
FIG. 24 is a perspective view of a rotational-rate sensor according to a seventh embodiment of the present invention.

FIG. 24 is a perspective view of a rotational-rate sensor according to a seventh embodiment of the present invention. The rotational-rate sensor shown in FIG. 24 includes the rotational-rate sensor 1d shown in FIG. 20, a substrate 120, and a holder 121. The rotational-rate sensor of the multi-axis detection type is configured by the two rotational-rate sensors 1d. The two rotational-rate sensors 1d are mounted adjacent to each other on the substrate 120 which is a hard substrate, using the adhesive layer 89 as the fixing member. This makes it possible to conduct a multi-axis detection in which the sensors cannot easily interfere with each other.

Furthermore, the two rotational-rate sensors 1d are mounted on the substrate 120, so that the rotation detection-axis directions ω of the two rotational-rate sensors 1d are identical with each other. Then, they are housed in the holder 121. According to this configuration of the seventh embodiment, an output of each sensor in the same direction can be compared and monitored. This helps configure a redundant rotational-rate sensor of the multi-axis detection type.

Moreover, in the two rotational-rate sensors 1d, a resonance frequency in the drive directions of each detecting element becomes substantially equal. Hence, there is no need to expressly design each detecting element at a resonance frequency different from each other. This makes it possible to set the sensor at a moderate price.

In addition, if the two rotational-rate sensors 1d are placed so that their rotation detection-axis directions ω are opposite to each other, the differential motion between an output of each of the two rotational-rate sensors 1d can be obtained. In that case, a common noise or the like can also be distinguished.

According to the above described configuration, the sensor's output becomes highly reliable. For example, a rotational-rate sensor of the multi-axis detection type can be provided which is suitable for the usage purpose of a product that requires great reliability, such as an automobile. Besides, restrictions on the shape and cost of the sensor can also be removed.

Herein, according to this embodiment, an example is mentioned in which the two rotational-rate sensors 1d are mounted, so that their rotation detection-axis directions ω are identical with each other. However, the present invention is not limited to this. According to usage purposes, three or more rotational-rate sensors can also be mounted, so that their rotation detection-axis directions ω are identical with each other. In addition, a rotational-rate sensor in use is not limited especially to the above described example, either. Even if the rotational-rate sensor according to any of the other embodiments is used, the same advantages can be obtained. With regard to this point, the same is applied to other embodiments described below.

(Eighth Embodiment)

Figure 25:
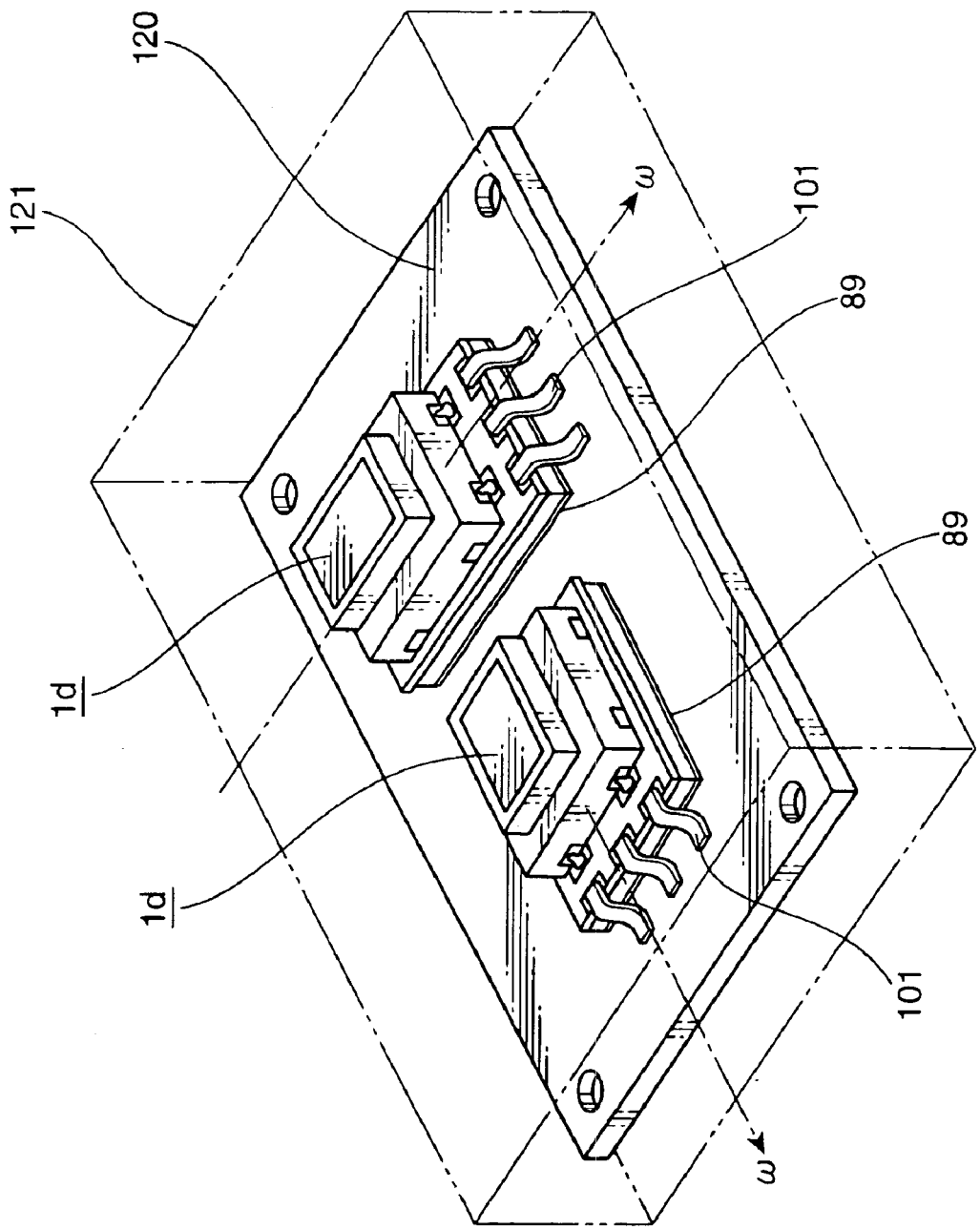
FIG. 25 is a perspective view of a rotational-rate sensor according to an eighth embodiment of the present invention.

FIG. 25 is a perspective view of a rotational-rate sensor according to an eighth embodiment of the present invention. The rotational-rate sensor shown in FIG. 25 includes the rotational-rate sensor 1d shown in FIG. 20, the substrate 120, and the holder 121. The rotational-rate sensor of the multi-axis detection type is configured by the two rotational-rate sensors 1d.

Furthermore, the two rotational-rate sensors d are mounted on the substrate 120, so that the rotation detection-axis directions ω of the two rotational-rate sensors 1d are perpendicular to each other. Then, they are housed in the holder 121. According to this configuration of the eighth embodiment, a vibration of each of the two rotational-rate sensors 1d is separated and independent. Therefore, even though they are placed adjacent to each other, they are not subjected to a harmful influence such as interference. This helps realize a rotational-rate sensor of the multi-axis detection type in which two rotational-rate sensors are densely mounted.

(Ninth Embodiment)

Figure 26:
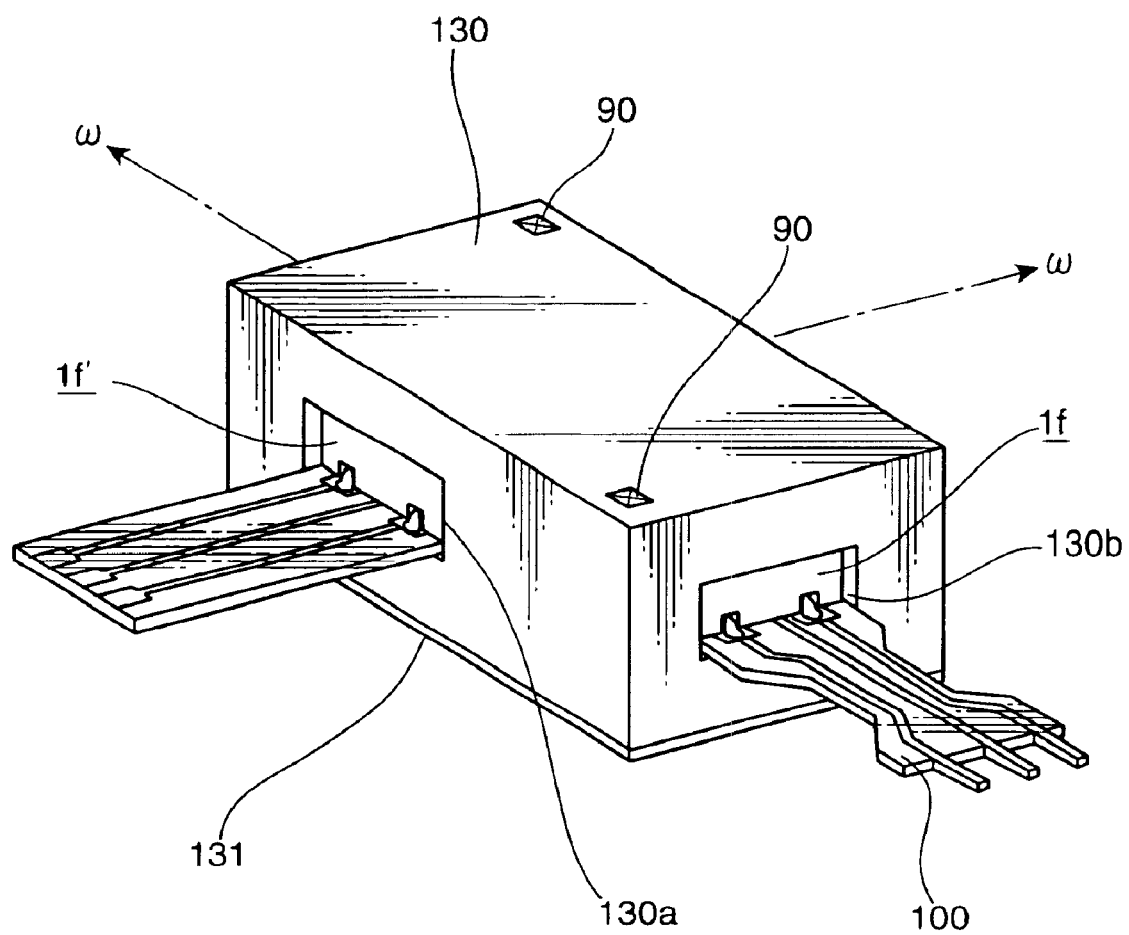
FIG. 26 is a perspective view of a rotational-rate sensor according to a ninth embodiment of the present invention.

FIG. 26 is a perspective view of a rotational-rate sensor according to a ninth embodiment of the present invention. The rotational-rate sensor shown in FIG. 26 includes two rotational-rate sensors 1f, 1f', a holder 130, and an adhesive sheet 131. The rotational-rate sensor of the multi-axis detection type is configured by the two rotational-rate sensors 1f, 1f'.

The box-shaped holder 130 is made of urethane. In the holder 130, cavities 130a, 130b are formed in which the two rotational-rate sensors 1f, 1f' whose rotation detection-axis directions ω are perpendicular to each other are buried. On the bottom surface of the holder 130, the adhesive sheet 131 is disposed as the fixing member.

In this way, the box-shaped holder 130 which is made of polyurethane is used, thereby further enhancing the sensor's resistant capability to environmental conditions such as an impact. In addition, the adhesive sheet 131 is used as the adhesive layer, and thus, the sensor can be simply and efficiently fixed to the attached body. Besides, in the holder 130, the cavities 130a, 130b are formed which can house at east a plurality of airtight containers and mounting portions of the rotational-rate sensors 1f, 1f'. Thereby, the plurality of sensors' resistant capability to environmental conditions such as an impact can be further enhanced. Moreover, the recognition mark 90 at the time of mounting is made on the upper surface of the holder 130. This keeps down an angular shift at the time when it is automatically mounted. Furthermore, inside of the holder 130, the rotation detection-axis directions ω of the two rotational-rate sensors 1f, 1f' are perpendicular to each other. This realizes a sensor which can detect a rotational rate, using two axes in the single holder 130.

Herein, the rotational-rate sensor if is equivalent to the one which is obtained by removing the silicone rubber 88 and the adhesive layer 89 from the rotational-rate sensor shown in FIG. 22. On the other hand, the rotational-rate sensor 1f' is equivalent to the one which is obtained by removing the silicone rubber 88, the adhesive layer 89 and the narrow portion 111 from the rotational-rate sensor 1e shown in FIG. 22. The other configuration is the same as the rotational-rate sensor 1e shown in FIG. 22.

In addition, the transfer characteristic of a supporting system which is configured by a crystal tuning-fork vibrator, a circuit portion and an airtight container, and the substrate 100 and the holder 130, and the adhesive sheet 131 of the rotational-rate sensors 1f, 1f' is set in the same way as the supporting-system transfer characteristics shown in FIG. 6A and FIG. 6B, or FIG. 10 which are described above. Hence, the same advantages can be obtained.

According to the above described configuration of this embodiment, even though the detecting element is made smaller as the sensor becomes smaller, the dispersion of the sensor's products cannot deteriorate its characteristics. In addition, a micro-miniature rotational-rate sensor of the multi-axis detection type which is highly reliable even if a disturbance acceleration or an impact is applied can be provided at a low price. Especially, a rotational-rate sensor of the multi-axis detection type which is mounted on a surface can be provided at a low price. Moreover, in this embodiment, the adhesive sheet 131 is provided, and thus, the sensor can be attached to a member other than a substrate, such as a frame of a product in which a rotational-rate sensor of the multi-axis detection type is used.

Herein, in the above description, an example is mentioned In which the adhesive sheet 131 is used. However, instead of an adhesive sheet, a magnet such as a magnetic sheet may also be used. In that case, the sensor can be simply and efficiently fixed to the attached body. Besides, an example is described in which the holder 130 which is made of urethane is used. However, the present invention is not limited especially to this example, and thus, it can also be made of rubber. In addition, the holder 130 has a box shape, but It may also have various shapes, such as a cylinder. Moreover, an example is described in which two cavities are provided in the holder 130. However, three or more cavities can also be provided according to usage purposes. Furthermore, each embodiment described above can be combined at discretion. In that case, the same advantages can be obtained.

This application is based on Japanese patent application serial No. 2003-357695, filed in Japan Patent Office on Oct. 17, 2003, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A rotational-rate sensor, comprising:
    a detecting element;
    a circuit portion for controlling the drive of the detecting element at the resonance frequency thereof in the direction where the detecting element is driven, and outputting, through a low-pass filter, a signal according to a rotational rate that is obtained from the detecting element;
    an airtight container which houses the detecting element and the circuit portion, the airtight container being made of ceramics or resin and including wiring for transmitting an input and output signal to the circuit portion; and
    an elastic body which is disposed between the airtight container and an attached body to which the rotational-rate sensor is attached, wherein:
    the synthetic resonance-frequency of a machine system which is formed at least by the detecting element, the circuit portion, the airtight container and the elastic body, and the frequency of an applied rotational rate which corresponds to the difference between the resonance frequency in the direction where the detecting element is driven and the resonance frequency of the detecting element in the direction where the detecting element detects a rotational rate, are each lower than each of the resonance frequency in the direction where the detecting element is driven and the resonance frequency in the direction where the detecting element detects a rotational rate; and
    the cut-off frequency of the low-pass filter in the circuit portion is lower than each of the synthetic resonance-frequency and the frequency of the applied rotational rate.

2. The rotational-rate sensor according to claim 1, wherein:
    the elastic body includes a conductor portion which is electrically connected to the wiring which is formed in the airtight container, and is connected to at least one of the outside surfaces of the airtight container;
    the synthetic resonance-frequency of the machine system which is formed by the detecting element, the circuit portion, the airtight container and the elastic body, is lower than each of the resonance frequency in the direction where the detecting element is driven and the resonance frequency in the direction where the detecting element detects a rotational rate, and in addition, is higher than the frequency of the applied rotational rate which corresponds to the difference between the resonance frequency in the direction where the detecting element is driven and the resonance frequency in the direction where the detecting element detects a rotational rate; and
    the cut-off frequency of the low-pass filter in the circuit portion is lower than the frequency of the applied rotational rate.

3. The rotational-rate sensor according to claim 2, wherein:
    the synthetic resonance-frequency is 2 kHz or higher, and 4 kHz or lower;
    the resonance frequency in the direction where the detecting element is driven is 10 kHz or higher;
    the frequency of the applied rotational rate is 200 Hz or higher, and 500 Hz or lower;
    the cut-off frequency of the low-pass filter is 100 Hz or lower; and
    the order of the low-pass filter is substantially three or more.

4. The rotational-rate sensor according to claim 1, wherein:
    the elastic body includes a conductor portion which is electrically connected to the wiring which is formed in the airtight container, and is connected to at least one of the outside surfaces of the airtight container;
    the frequency of the applied rotational rate which corresponds to the difference between the resonance frequency in the direction where the detecting element is driven and the resonance frequency of the detecting element in the direction where the detecting element detects a rotational rate is lower than each of the resonance-frequency in the direction were the detecting element is driven and the resonance frequency in the direction where the detecting element detects a rotational rate, and in addition, is higher than the synthetic resonance-frequency of the machine system which is formed by the detecting element, the circuit portion, the airtight container and the elastic body; and
    the cut-off frequency of the low-pass filter in the circuit portion is lower than the synthetic resonance-frequency.

5. The rotational-rate sensor according to claim 4, wherein:
    the synthetic resonance-frequency is 300 Hz or higher, and 600 Hz or lower;
    the resonance frequency in the direction where the detecting element is driven is 10 kHz or higher;

the frequency of the applied rotational rate is 1 kHz or higher, and 2 kHz or lower;

the cut-off frequency of the low-pass filter is 100 Hz or lower; and the order of the low-pass filter is substantially three or more.

6. The rotational-rate sensor according to claim 2, wherein on one surface of the elastic body, a first pad electrode is provided in the position which corresponds to the conductor portion of the airtight container; on the other surface thereof, a second pad electrode is provided which is electrically connected to the outside; and on the side surface thereof, a conductor pattern is provided which connects the first and second pad electrodes.

7. The rotational-rate sensor according to claim 6, wherein the second pad electrodes are disposed in at least four corners of the other surface of the elastic body.

8. The rotational-rate sensor according to claim 6, wherein the first and second pad electrodes include at least three systems of pad electrodes for a power source, an output and a ground, and the pad electrode for an output is disposed between the pad electrode for a power source and the pad electrode for a ground.

9. The rotational-rate sensor according to claim 2, wherein the ratio of the width La of the airtight container in the direction perpendicular to a detection axis which detects a rotational rate, to the total thickness Lb of the airtight container and the elastic body, or La/Lb, is 1.0 or more.

10. The rotational-rate sensor according to claim 2, wherein in the elastic body, a protrusion is provided which fits into a hole that is formed in a substrate on which the elastic body is mounted.

11. The rotational-rate sensor according to claim 2, wherein the elastic body is made of a sheet of rubber in which a thin metal-wire is buried so that the elastic body conducts electricity in the direction of the thickness thereof.

12. The rotational-rate sensor according to claim 2, wherein the elastic body is made of urethane, or silicone which has a cavity.

13. The rotational-rate sensor according to claim 2, wherein the elastic body is made of a magnetic body, or an elastic material which has a magnet.

14. The rotational-rate sensor according to claim 2, wherein the elastic body is a sheet which is made of fibrous glass or resin.

15. The rotational-rate sensor according to claim 2, wherein the elastic body is formed by a plurality of columnar bodies or spherical bodies which each have an elliptic or circular section.

16. The rotational-rate sensor according to claim 2, wherein in the elastic body, a notch or a thin portion is formed which is parallel to a detection axis which detects a rotational rate.

17. The rotational-rate sensor according to claim 2, wherein in the elastic body, an adhesive member is formed which fixes the elastic body on a substrate.

18. The rotational-rate sensor according to claim 2, wherein the detecting element is a resonance-type vibrator which is made of single-crystal quartz or joined quartz.

19. The rotational-rate sensor according to claim 18, wherein the resonance-type vibrator is a tuning-fork vibrator of the one-end closed type.

20. The rotational-rate sensor according to claim 18, wherein the resonance-type vibrator is an H-type vibrator.

21. The rotational-rate sensor according to claim 2, wherein the detecting element is a beam-type vibrator which is formed out of a silicone plate, using etching.

22. The rotational-rate sensor according to claim 2, wherein the detecting element is a ring-shaped vibrator which is formed out of a silicone plate, using etching.

23. The rotational-rate sensor according to claim 2, wherein the detecting element is a vibrating element: which includes a resonance-type vibrator arm, a base portion, a beam that supports the base port ion, an d a rectangular frame body that supports the beam which are unitedly formed out of a silicone substrate, using etching; and in which a PZT-system piezo-electric film whose thickness is 1 $\mu$m or more and 5 $\mu$m or less is formed on the main surface of the resonance-type vibrator arm.

24. The rotational-rate sensor according to claim 23, wherein a circuit is unitedly formed on one and the same surface of the silicone substrate.

25. The rotational-rate sensor according to claim 2, wherein the detecting element is a vibrator which is made of ceramics and is shaped like a prism or a column.

26. The rotational-rate sensor according to claim 2, wherein the detecting element is a vibrator in which a surface acoustic wave is used.

27. The rotational-rate sensor according to claim 2, wherein the circuit portion sends out an output of digital type.

28. The rotational-rate sensor according to claim 27, wherein the digital output is a PWM-form output.

29. The rotational-rate sensor according to claim 2, wherein the elastic body is attached to the surface of the airtight container.

30. The rotational-rate sensor according to claim 2, wherein the ratio of the total mass M of the circuit portion and the airtight container to the mass m of the elastic body, or M/m, is 5.0 or more.

31. The rotational-rate sensor according to claim 1, further comprising:

a support member which includes: a mounting portion that is connected to at least one of the outside surfaces of the airtight container so that the mounting portion is electrically connected to the airtight container; a terminal portion that is electrically connected to the outside; and a shifting portion that is provided with a conductive pattern which electrically connects the mounting portion and the terminal portion, and that has a low rigidity and a high flexibility; and a fixing member which is fixed to the elastic body and fixes the rotational-rate sensor to the attached body, wherein:

the elastic body is attached between the attached body and the mounting portion of the support member;

the synthetic resonance-frequency of a machine system which is formed by the detecting element, the circuit portion, the airtight container, the support member, the elastic body and the fixing member is lower than each of the resonance frequency in the direction where the detecting element is driven and the resonance frequency in the direction where the detecting element detects a rotational rate, and in addition, is higher than the frequency of the applied rotational rate which corresponds to the difference between the resonance frequency in the direction where the detecting element is driven and the resonance frequency in the direction where the detecting element detects a rotational rate; and the cut-off frequency of the low-pass filter in the circuit portion is lower than the frequency of the applied rotational rate.

32. The rotational-rate sensor according to claim 31, wherein:
- the synthetic resonance-frequency is 2 kHz or higher, and 4 kHz or lower;
- the resonance frequency in the direction where the detecting element is driven is 10 kHz or higher;
- the frequency of the applied rotational rate is 200 Hz or higher, and 500 Hz or lower;
- the cut-off frequency of the low-pass filter is 100 Hz or lower; and
- the order of the low-pass filter is substantially three or more.

33. The rotational-rate sensor according to claim 1, further comprising:
- a support member which includes: a mounting portion that is connected to at least one of the outside surfaces of the airtight container so that the mounting portion is electrically connected to the airtight container; a terminal portion that is electrically connected to the outside; and a shifting portion that is provided with a conductive pattern which electrically connects the mounting portion and the terminal portion, and that has a low rigidity and a high flexibility; and
- a fixing member which is fixed to the elastic body and fixes the rotational-rate sensor to the attached body, wherein:
- the elastic body is attached between the attached body and the mounting portion of the support member;
- the frequency of the applied rotational rate which corresponds to the difference between the resonance frequency in the direction where the detecting element is driven and the resonance frequency of the detecting element in the direction where the detecting element detects a rotational rate is lower than each of the resonance frequency in the direction where the detecting element is driven and the resonance frequency in the direction where the detecting element detects a rotational rate, and in addition, is higher than the synthetic resonance-frequency of a machine system which is formed by the detecting element, the circuit portion, the airtight container, the support member, the elastic body and the fixing member; and
- the cut-off frequency of the low-pass filter in the circuit portion is lower than the synthetic resonance-frequency.

34. The rotational-rate sensor according to claim 33, wherein:
- the synthetic resonance-frequency is 300 Hz or higher, and 600 Hz or lower;
- the resonance frequency in the direction where the detecting element is driven is 10 kHz or higher;
- the frequency of the applied rotational rate is 1 kHz. or higher, and 2 kHz or lower;
- the cut-off frequency of the low-pass filter is 100 Hz or lower; and
- the order of the low-pass filter is substantially three or more.

35. The rotational-rate sensor according to claim 31, wherein at plurality of holes are formed in the shifting portion.

36. The rotational-rate sensor according to claim 31, wherein a notch or a narrow portion is formed in the shifting portion.

37. The rotational-rate sensor according to claim 31, wherein a terminal for positioning and fixing is provided near the terminal portion.

38. The rotational-rate sensor according to claim 31, wherein a metal terminal which is shaped like a wire or a plate is joined to a conductor piece of the terminal portion, using resistance welding or ultrasonic welding.

39. The rotational-rate sensor according to claim 31, wherein the fixing member is an adhesive layer or a magnet.

40. The rotational-rate sensor according to claim 31, wherein the airtight container has a substantially rectangular-parallelepiped shape, and a mark for recognition at the time of mounting is made on the upper surface of the airtight container.

41. The rotational-rate sensor according to claim 31, wherein the shifting portion of the support member is formed by a hard substrate which has a thickness of 0.1 mm or more and 1 mm or less and has at least one of a notch, a narrow portion and a plurality of holes.

42. The rotational-rate sensor according to claim 41, wherein the elastic body has a laminated structure.

43. The rotational-rate sensor according to claim 41, wherein in the terminal portion, a flexible metal terminal which is shaped like a wire or a plate is connected to the conductive pattern.

44. The rotational-rate sensor according to claim 41, wherein the fixing member is an adhesive layer or a magnet.

45. The rotational-rate sensor according to claim 41, wherein the airtight container has a substantially rectangular-parallelepiped shape, and a mark for recognition at the time of mounting is made on the upper surface of the airtight container.

46. The rotational-rate sensor according to claim 31, wherein:
- the rotational-rate sensor includes a plurality of rotational-rate sensors; and
- the plurality of rotational-rate sensors are mounted adjacent to each other on a hard substrate, using the fixing member.

47. The rotational-rate sensor according to claim 46, wherein at least two of the plurality of rotational-rate sensors are disposed so that the detection axes thereof are located substantially in the same direction.

48. The rotational-rate sensor according to claim 46, wherein the resonance frequency of each detecting element of the plurality of rotational-rate, sensors in the direction where the detecting element is driven is substantially the same.

49. The rotational-rate sensor according to claim 1, further comprising:
- a support member which includes: a mounting portion that is connected to at least one of the outside surfaces of the airtight container so that the mounting portion is electrically connected to the airtight container; a terminal portion that is electrically connected to the outside; and a shifting portion that is provided with a conductive pattern which electrically connects the mounting portion and the terminal portion, and that has a low rigidity and a high flexibility; and
- a fixing member which is fixed to the elastic body and fixes the rotational-rate sensor to the attached body, wherein:
- the elastic body includes a holder which is made of polyurethane or rubber and is shaped like a cylinder or a box, and in the holder, a cavity is formed which stores and holds at least the airtight container and the mounting portion;
- at least the terminal portion extends outside of the holder;
- the synthetic resonance-frequency of a machine system which is formed by the detecting element, the circuit portion, the airtight container, the support member, the holder and the fixing member is lower than each of the resonance frequency in the direction where the detecting element is driven and the resonance frequency in the direction where the detecting element detects a rotational rate, and in addition, is higher than the frequency of the applied rotational rate which corresponds to the difference between the resonance frequency in the direction where the detecting element is driven and the resonance frequency in the direction where the detecting element detects a rotational rate; and the cut-off frequency of the low-pass filter in the circuit portion is lower than the frequency of the applied rotational rate.

50. The rotational-rate sensor according to claim 49, wherein:

the synthetic resonance-frequency is 2 kHz or higher, and 4 kHz or lower;

the resonance frequency in the direction where the detecting element is driven is 10 kHz or higher;

the frequency of the applied rotational rate is 200 Hz or higher, and 500 Hz or lower;

the cut-off frequency of the low-pass filter is 100 Hz or lower; and the order of the low-pass filter is substantially three or more.

51. The rotational-rate sensor according to claim 1, further comprising:

a support member which includes: a mounting portion that is connected to at least one of the outside surfaces of the airtight container so that the mounting portion is electrically connected to the airtight container; a terminal portion that is electrically connected to the outside; and a shifting portion that is provided with a conductive pattern which electrically connects the mounting portion and the terminal portion, and that has a low rigidity and a high flexibility; and a fixing member which is fixed to the elastic body and fixes the rotational-rate sensor to the attached body, wherein:

the elastic body includes a holder which is made of polyurethane or rubber and is shaped like a cylinder or a box, and in the holder, a cavity is formed which stores and holds at least the airtight container and the mounting portion;

at least the terminal portion extends outside of the holder;

the frequency of the applied rotational rate which corresponds to the difference between the resonance frequency in the direction where the detecting element is driven and the resonance frequency of the detecting element in the direction where the detecting element detects a rotational rate is lower than each of the resonance frequency in the direction where the detecting element is driven and the resonance frequency in the direction where the detecting the airtight container, the support member, the holder and the fixing member; and the cut-off frequency of the low-pass filter in the circuit portion is lower than the synthetic resonance-frequency.

52. The rotational-rate sensor according to claim 51, wherein:

the synthetic resonance-frequency is 300 Hz or higher, and 600 Hz or lower;

the resonance frequency in the direction where the detecting element is driven is 10 kHz or higher;

the frequency of the applied rotational rate is 1 kHz or higher, and 2 kHz or lower;

the cut-off frequency of the low-pass filter is 100 Hz or lower; and the order of the low-pass filter is substantially three or more.

53. The rotational-rate sensor according to claim 49, wherein the fixing member is an adhesive layer or a magnet.

54. The rotational-rate sensor according to claim 49, wherein a mark for recognition at the time of mounting is made on the upper surface of the holder.

55. The rotational-rate sensor according to claim 49, wherein in the holder, a cavity is formed which stores at least a plurality of the airtight containers and the mounting portions.

56. The rotational-rate sensor according to claim 55, wherein the detecting elements in the holder are disposed perpendicular to each other .

* * * * *